US012771285B2

(12) United States Patent
Huzyak et al.

(10) Patent No.: US 12,771,285 B2
(45) Date of Patent: Oct. 20, 2026

(54) MODULE MOUNTING SYSTEM FOR A SOLAR STRUCTURE

(71) Applicant: FLEXRACK by Qcells LLC, Highland Hills, OH (US)

(72) Inventors: Gregory P. Huzyak, Salem, OH (US); Nathan A. Knapp, Warren, OH (US); Dalton L. Hancock, Bay Village, OH (US); Jesse J. Saluga, Youngstown, OH (US)

(73) Assignee: FLEXRACK by Qcells LLC, Highland Hills, OH (US)

( * ) Notice: Subject to any disclaimer, the term of this patent is extended or adjusted under 35 U.S.C. 154(b) by 0 days.

(21) Appl. No.: 18/825,506

(22) Filed: Sep. 5, 2024

(65) Prior Publication Data

US 2025/0080040 A1 Mar. 6, 2025

Related U.S. Application Data

(60) Provisional application No. 63/536,564, filed on Sep. 5, 2023.

(51) Int. Cl.
*H02S 20/32* (2014.01)

(52) U.S. Cl.
CPC .................................... *H02S 20/32* (2014.12)

(58) Field of Classification Search
CPC ....................................................... H02S 20/32
See application file for complete search history.

(56) References Cited

U.S. PATENT DOCUMENTS

2015/0059827 A1* 3/2015 Reed ..................... F24S 30/425 136/246
2015/0200621 A1* 7/2015 Reed ..................... F24S 25/636 29/525.01
2017/0229998 A1* 8/2017 Molina ................... H02S 20/10
2017/0359017 A1* 12/2017 Corio ..................... F16M 11/18
2022/0193927 A1* 6/2022 Mazzetti, Jr. .......... B25J 9/1697
2022/0271706 A1* 8/2022 Creasy .................... H02S 30/10
2022/0325736 A1* 10/2022 De La Fuente De Pablo ............. F24S 30/425
2023/0188086 A1 6/2023 Garza et al.
2023/0223891 A1* 7/2023 Rodriguez Gonzalez .................. F24S 30/425 136/246
2023/0261610 A1* 8/2023 Watson ................... H02S 30/20 136/245

* cited by examiner

*Primary Examiner* — Jayne L Mershon
(74) *Attorney, Agent, or Firm* — Sheppard Mullin Richter & Hampton LLP

(57) ABSTRACT

A module mounting assembly for coupling a solar module to a torque tube comprises a hat rail; a first vertical member pivotably coupled to the hat rail at first connection points and capable of being pivoted to rest flush on a first torque tube side surface during installation, the first vertical member having first retention features; a second vertical member pivotably coupled to the hat rail at second connection points and capable of being pivoted to rest flush on a second torque tube side surface during installation, the second vertical member having second retention features; a locking mechanism configured to cooperate with the first retention features and the second retention features to prevent the first and second vertical members from pivoting to secure the first vertical member flush on the first torque tube side surface and to secure the second vertical member flush on the second torque tube side surface.

21 Claims, 22 Drawing Sheets

MODULE MOUNTING SYSTEM FOR A SOLAR STRUCTURE

PRIORITY CLAIM

This application claims benefit of and hereby incorporates by reference provisional patent application No. 63/536,564, entitled "Module Mounting System for a Solar Structure," filed on Sep. 5, 2023, by inventors Huzyak et al.

TECHNICAL FIELD

This invention relates generally to solar modules, and more particularly provides a mounting assembly for solar modules.

BACKGROUND

Solar modules are typically attached to a substructure that holds the solar modules in a single orientation or across multiple orientations to capture incident light. Solar modules are typically fastened to the substructure using complex mounting processes that typically require considerable time and effort. Therefore, there is need for improved mounting assemblies and processes to attach solar modules to a substructure.

SUMMARY

Embodiments of the present invention provide a single-axis rotational solar tracker. The solar tracker includes posts, a torque tube, a slew drive and rotational couplings, which are parts of a substructure for supporting solar modules. The posts may include footers and columns to raise the torque tube above ground. The torque tube includes a beam that extends between the posts and that may have one or more of a variety of different cross-sectional shapes. In some embodiments, the torque tube has a rectangular cross-section relatively consistent across its length, thereby forming a top surface, bottom surface opposite the top surface, and two opposing side surfaces between the top and bottom surfaces. The slew drive and rotational couplings may be configured to control single-axis rotation of the torque tube 104 along its length.

The solar tracker includes solar module mounting assemblies affixed to the torque tube for coupling the solar modules to the torque tube. Multiple module mounting assemblies can be positioned along the torque tube in a spaced-apart relationship, such that each pair of adjacent solar module mounting assemblies can support a solar module therebetween by its frame. The distance between each pair of module mounting assemblies may be dictated by the width of each solar module coupled therebetween.

In some embodiments, each module mounting assembly includes a hat rail, which may be shaped as an omega beam. The hat rail may be configured to have its open end resting on the top surface of the torque tube when installed. The hat rail may also have a flanged base to better rest on top of the torque tube. The hat rail may have a flat top surface to support solar module frames when positioned on top. The hat rail may have alignment notches and/or alignment tabs to index the solar module frames when positioned on top. The hat rail may have a width sufficiently wide to support two solar module frames, namely, the adjacent frames of adjacent solar modules.

In some embodiments, the module mounting assembly includes two vertical members coupled to the hat rail in a spaced-apart relationship. The distance between the two vertical members may substantially equal the width between the opposing side surfaces of the torque tube, so that when the vertical members are positioned to straddle the torque tube, the open end of the hat rail rests on the top surface of the torque tube and the back surfaces of the vertical members rest substantially flush against the opposing side surfaces of the torque tube.

The two vertical members may be coupled to the hat rail by coupling bolts through holes disposed in the opposing side walls of the hat rail and disposed in opposing sides of the vertical members. Coupling nuts may be used to secure the coupling bolts. By using holes, coupling bolts and coupling nuts, the vertical members may pivot relative to the hat rail before installation on the torque tube.

Each of the vertical members may have a back surface configured to rest flush against a side surface of the torque tube. In some embodiments, each of the side surface of the torque tube may be flat and each of the back surfaces of the vertical members may be flat, although they need not be. Each of the vertical members may also include side projections that reinforce the stability of the vertical members.

In some embodiments, the module mounting assembly further includes a locking bolt and corresponding nut configured to retain the vertical members in a straddled relationship about the torque tube. The locking bolt is sufficiently long to tie the bottom ends of the vertical members together when straddling the torque tube. The locking bolt and corresponding nut may cooperate with retention features in the vertical members to assist in securing the vertical members against the torque tube.

In some embodiments, a supporting strut may be coupled between the hat rail and each vertical member. The supporting strut may couple to the respective vertical member at a position between the top and bottom ends of the vertical member.

In some embodiments, the present invention may provide a module mounting assembly for coupling a solar module to a torque tube, the torque tube having a top tube surface, a first side tube surface, a second side tube surface opposing the first side tube surface, and a bottom surface, the module mounting assembly comprising a hat rail having a top rail surface, a bottom rail opening, opposing side rail surfaces, first connection points and second connection points; a first vertical member pivotably coupled to the hat rail at the first connection points, the first vertical member capable of being pivoted to rest flush on the first tube side surface of the torque tube during installation, the first vertical member having one or more first retention features; a second vertical member pivotably coupled to the hat rail at the second connection points, the second vertical member capable of being pivoted to rest flush on the second tube side surface of the torque tube during installation, the second vertical member having one or more second retention features; a locking mechanism configured to cooperate with the one or more first retention features and the one or more second retention features to prevent the first vertical member and the second vertical member from pivoting to secure the first vertical member flush on the first tube side surface of the torque tube and to secure the second vertical member flush on the second tube side surface of the torque tube.

The hat rail may include an omega beam. The first connection points may be disposed on the opposing side rail surfaces at a first position along a length of the hat rail. The second connection points may be disposed on the opposing side rail surfaces at a second position along a length of the hat rail. The distance between the first position and the second position may be substantially equal to a width between the first side tube surface and the second side tube surface. The first connection points and the second connection points may include rail holes. The first vertical member may be pivotably coupled to the hat rail at the first connection points using a coupling bolt and coupling nut. The first vertical member may include a flat surface configured to rest flush against the first tube side surface of the torque tube after installation. The first vertical member may include side extensions to increase rigidity of the first vertical member. The side extensions may include a top segment with coupling holes configured to cooperate with the hat rail at the first connection points. The first vertical member may include a substantially consistent width. The first vertical member may have a strut-coupling segment that is wider than the top segment. A supporting strut may be coupled to the strut-coupling segment and to the hat rail at third connection points. The torque tube may include an opening in the bottom surface, and the first vertical member and the second vertical member may be pivoted to at least partially reside within the opening during transport. The one or more first retention features of the first vertical member may include a notch and retention tabs. The one or more second retention features of the second vertical member may include a window. The locking mechanism may include a locking bolt and a locking nut. The locking bolt may be sufficiently long to couple the first vertical member and the second vertical member across the bottom surface of the torque tube.

In some embodiments, the present invention may provide method for coupling a module mounting assembly to a torque tube, the torque tube having a top tube surface, a first side tube surface, a second side tube surface opposing the first side tube surface, and a bottom surface, the method comprising positioning a hat rail on top of a torque tube, the hat rail having a top rail surface, a bottom rail opening, opposing side rail surfaces, first connection points and second connection points; pivotably coupling a first vertical member to the hat rail at the first connection points, the first vertical member having one or more first retention features; pivotably coupling a second vertical member to the hat rail at the second connection points, the second vertical member having one or more second retention features; pivoting the first vertical member to rest flush on the first tube side surface of the torque tube; pivoting the second vertical member to rest flush on the second tube side surface of the torque tube; and installing a locking mechanism to cooperate with the one or more first retention features and the one or more second retention features to prevent the first vertical member and the second vertical member from pivoting to secure the first vertical member flush on the first tube side surface of the torque tube and to secure the second vertical member flush on the second tube side surface of the torque tube.

The first vertical member may have a strut-coupling segment that is wider than the top segment. The method may further comprise coupling a supporting strut to the strut-coupling segment and to the hat rail at third connection points. The one or more first retention features of the first vertical member may include a notch and retention tabs. The one or more second retention features of the second vertical member may include a window. The locking mechanism may include a locking bolt and a locking nut.

DETAILED DESCRIPTION

The following description is provided to enable a person skilled in the art to make and use various embodiments of the invention. Modifications are possible. The generic principles defined herein may be applied to the disclosed and other embodiments without departing from the spirit and scope of the invention. Thus, the claims are not intended to be limited to the embodiments disclosed, but are to be accorded the widest scope consistent with the principles, features and teachings herein.

Throughout this specification, plural instances may replace components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Figure 1:
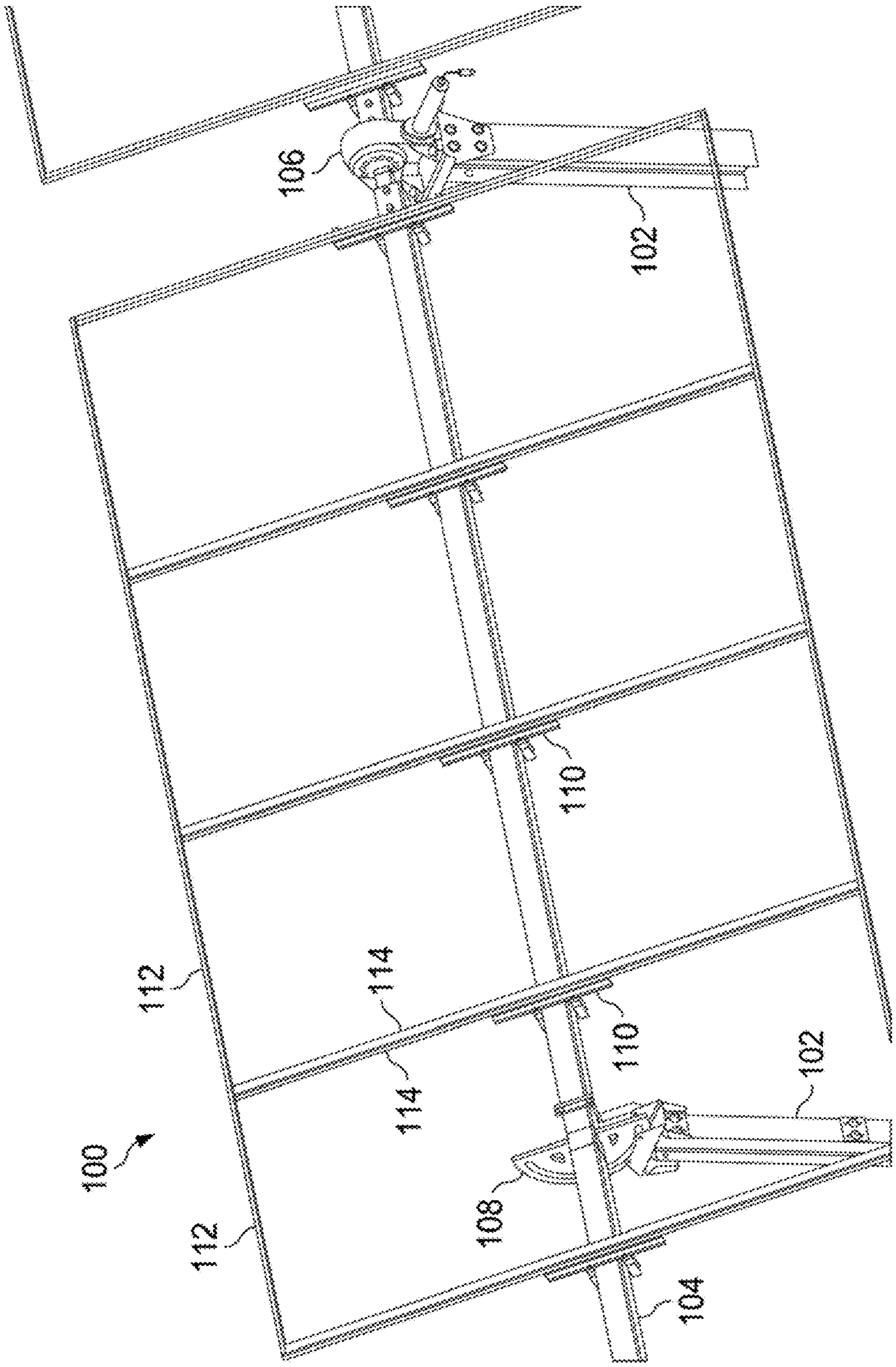
FIG. 1 is an isometric top perspective view of a solar tracker, in accordance with some embodiments of the present invention.

FIG. 1 is an isometric top perspective view of a single-axis rotational solar tracker 100, in accordance with some embodiments of the present invention. The solar tracker 100 includes posts 102, a torque tube 104, a slew drive 106 and rotational couplings 108, which are parts of a substructure for supporting solar modules 112. The posts 102 may include footers and columns to raise the torque tube 104 above ground. The torque tube 104 includes a beam that extends between the posts 102 and that may have one or more of a variety of different cross-sectional shapes. In the illustrated embodiment, the torque tube 104 has a rectangular cross-section relatively consistent across its length, thereby forming a top surface, bottom surface opposite the top surface, and two opposing side surfaces between the top and bottom surfaces. The slew drive 106 and rotational couplings 108 are configured to control single-axis rotation of the torque tube 104 along its length.

The solar tracker 100 further includes solar module mounting assemblies 110 affixed to the torque tube 104 for coupling the solar modules 112 to the torque tube 104. As shown, multiple module mounting assemblies 110 can be positioned along the torque tube 104 in a spaced-apart relationship, such that each pair of adjacent solar module mounting assemblies 110 can support a solar module 112 therebetween by its frame 114. Further, as shown, each solar module mounting assembly 110 can support adjacent sides of two solar module frames 114 of two solar modules 112. The distance between each pair of module mounting assemblies 110 may be dictated by the width of each solar module 112 coupled therebetween. In some embodiments, the module mounting assemblies 110 may be spaced apart equidistantly, although they need not be.

Figure 2:
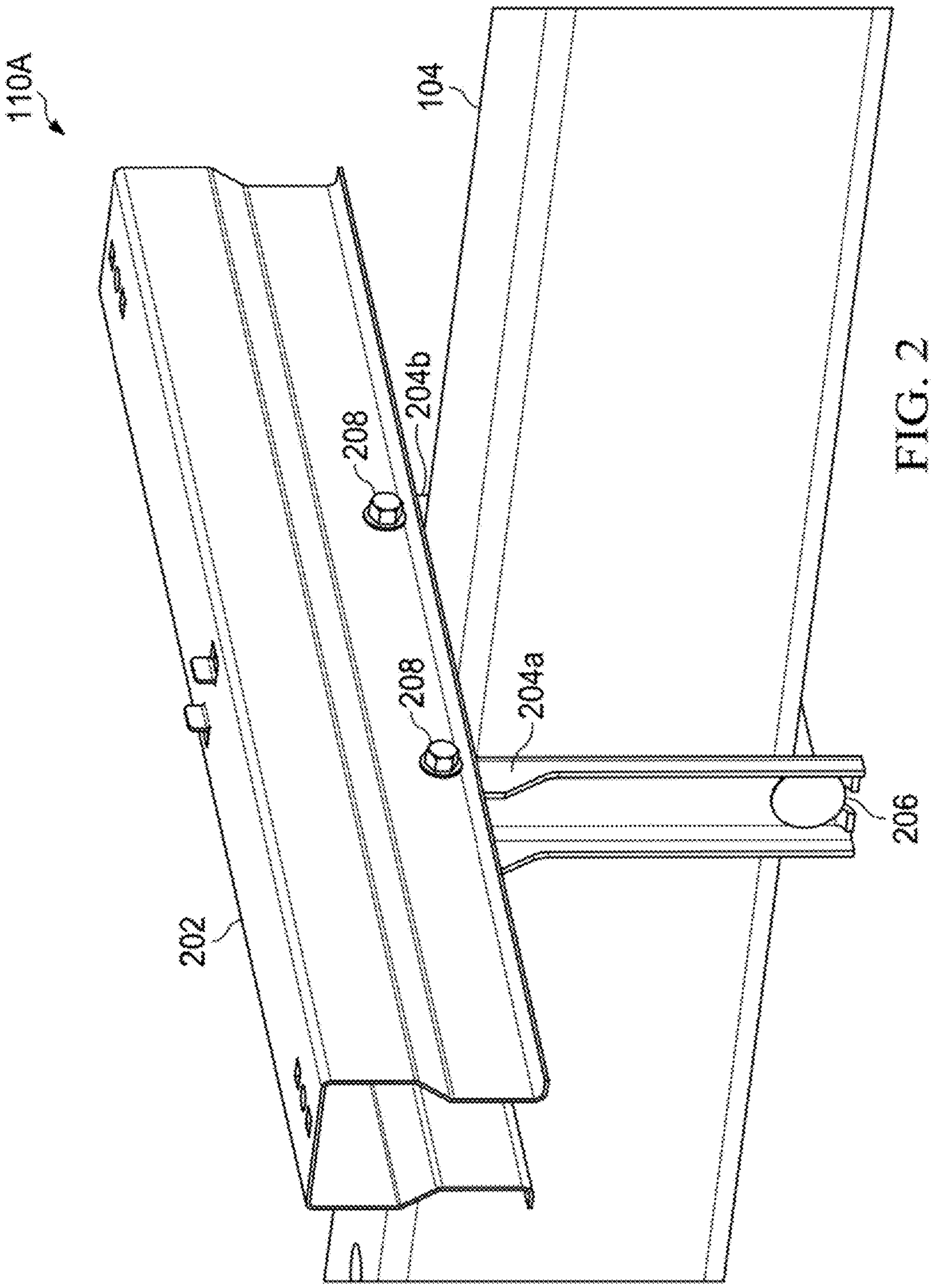
FIG. 2 is an isometric front side view of a module mounting assembly in an installed state, in accordance with some first embodiments of the present invention.

FIG. 2 is an isometric front side view of a module mounting assembly **110*a* in an installed state (installed to the torque tube 104), in accordance with some first embodiments of the present invention. As shown, the module mounting assembly 110*a* includes a hat rail 202, which in the illustrated embodiment is shaped as an omega beam. In other embodiments, the hat rail 202 may be a U-shaped beam or other-shaped beam. The hat rail 202 may be configured to have its open end resting on the top surface of the torque tube 104 when installed. The hat rail 202 may also have a flanged base to better rest on top of the torque tube 104. The hat rail 202 may have a flat top surface to support solar module frames 114 when positioned on top. The hat rail 202 may also have alignment notches and/or alignment tabs to index the solar module frames 114 when positioned on top. The hat rail 202 may have a width sufficiently wide to support two solar module frames 114, namely, the adjacent frames 114 of adjacent solar modules 112**.

The module mounting assembly **110*a* further includes two vertical members 204*a* and 204*b* coupled to the hat rail 202 in a spaced-apart relationship. The distance between the two vertical members 204*a* and 204*b* may substantially equal the width between the opposing side surfaces of the torque tube 104, so that when the vertical members 204*a* and 204*b* are positioned to straddle the torque tube 104, the open end of the hat rail 202 rests on the top surface of the torque tube 104 and the back surfaces of the vertical members 204*a* and 204*b* rest substantially flush against the opposing side surfaces of the torque tube 104**.

The two vertical members **204*a* and 204*b* may be coupled to the hat rail 202 by coupling bolts 208 through holes (not shown) disposed in the opposing side walls of the hat rail 202 and disposed in opposing sides of the vertical members 204*a* and 204*b*. Coupling nuts (not shown) may be used to secure the coupling bolts 208. By using holes, coupling bolts 208 and coupling nuts, the vertical members 204*a* and 204*b* may pivot relative to the hat rail 202 before installation. Although the module mounting assembly 110*a* is being described as using coupling bolts 208 and coupling nuts, other coupling mechanisms such as pins and clips can be used. Further, although the module mounting assembly 110*a* is being shown as using coupling bolts 208 that extend across the entire width of the hat rail 202 and vertical members 204*a* and 204*b*, a coupling bolt/nut pair can be used to couple each side of each vertical member 204*a* or 204*b* separately to a side of the hat rail 202**.

As shown, each of the vertical members **204*a* and 204*b* may have a back surface configured to rest flush against a side surface of the torque tube 104. In some embodiments, each of the side surface of the torque tube 104 may be flat and each of the back surfaces of the vertical members 204*a* and 204*b* may be flat, although they need not be. Each of the vertical members 204*a* and 204*b* may also include side projections that reinforce the stability of the vertical members 204*a* and 204*b***.

The module mounting assembly **110*a* further includes a locking bolt 206 and corresponding nut (not shown) configured to retain the vertical members 204*a* and 204*b* in a straddled relationship about the torque tube 104. The locking bolt 206 is sufficiently long to tie the bottom ends of the vertical members 204*a* and 204*b* together when straddling the torque tube 104. In the illustrated embodiment, the locking bolt 206 is longer than the thickness of the vertical members 204*a* and 204*b* and the width of the bottom surface of the torque tube 104. Described in further detail in at least FIG. 3 below, the locking bolt 206 and corresponding nut may cooperate with retention features in the vertical members 204*a* and 204*b* to assist the user in securing the vertical members 204*a* and 204*b* against the torque tube 104**.

Figure 3:
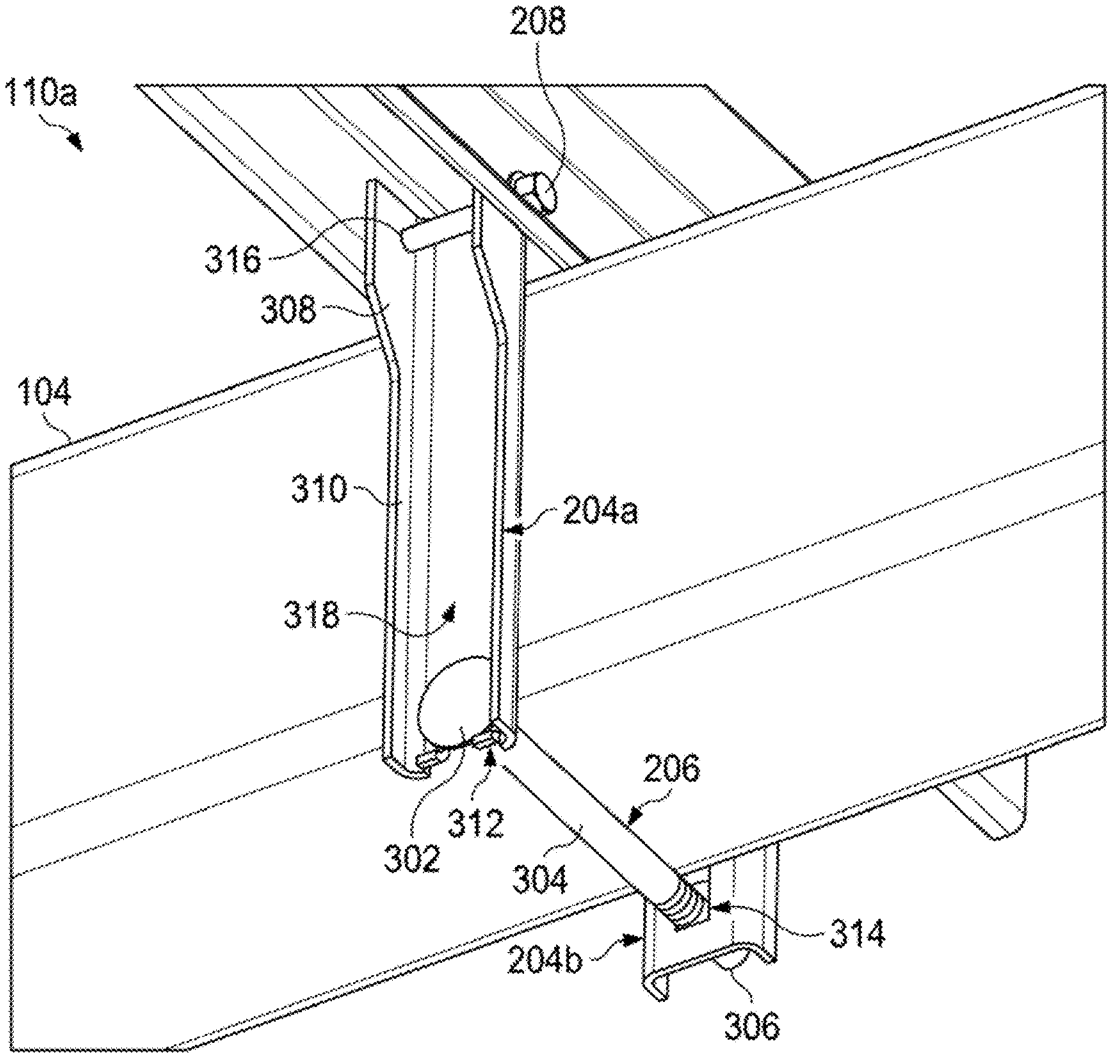
FIG. 3 is an isometric front bottom perspective view of the module mounting assembly in an installed state, in accordance with some first embodiments of the present invention.

FIG. 3 is an isometric front bottom perspective view of the module mounting assembly **110*a* in an installed state, in accordance with some first embodiments of the present invention. In FIG. 3, additional details of the vertical members 204***a* and 204*b*, coupling bolt 208 and locking bolt 206 are shown.

As shown, each of the vertical member 204*a* and 204*b* includes a back wall 318 configured to rest flush against a respective side surface of the torque tube 104. The vertical members 204*a* and 204*b* are longer than the opposing side surfaces of the torque tube 104. One or more retention features 312 (e.g., a notch and retention tabs) is disposed in the segment of the vertical member 204*a* that extends beyond the respective side surface of the torque tube 104. One or more retention features 314 (e.g., a window) are disposed in the segment of the vertical member 204*b* that extends beyond the respective side surface of the torque tube 104.

Each of the vertical members 204*a* and 204*b* includes top side projections 308 having a coupling hole 316 therein. As shown, the distance between the outer surfaces of the top side projections 308 of each of the vertical members 204*a* and 204*b* may be substantially the same as the distance between the inner surfaces of the hat rail 202, so that the vertical members 204*a* and 204*b* fit snugly within a segment of the opening of the hat rail 202 when installed.

Each of the vertical member 204*a* and 204*b* may also include lower side projections 310 extending along the length from the top side projections 308 downward. As shown, the lower side projections 310 may be disposed from the bottom of the top side projections 308 to the bottom of the vertical member 204*a* or 204*b*. In some embodiments, the lower side projections 310 extend outward less than the top side projections 308.

The locking bolt 206 may include a head 302, a shaft 304 and threading portion 306. The threading portion 306 may be configured to cooperate with a locking nut (slightly visible through the window of the one or more retention features 314). The shaft 304 and the head 302 of the locking bolt 206 may cooperate with the one or more retention features 312 of the vertical member 204*a*. The threading portion 306 of the locking bolt 206 and the locking nut may cooperate with the one or more retention features 314 of the vertical member 204*b*. The locking bolt 206 may be secured by affixing the locking nut to the threading portion 306.

It will be appreciated that the vertical member 204*b* may be similar to the vertical member 204*a*. However, the vertical member 204*b* may have different one or more retention features 314 (e.g., a window) than the one or more retention features 312 (e.g., a notch and retention tabs) of the vertical member 204*a*.

Figure 4:
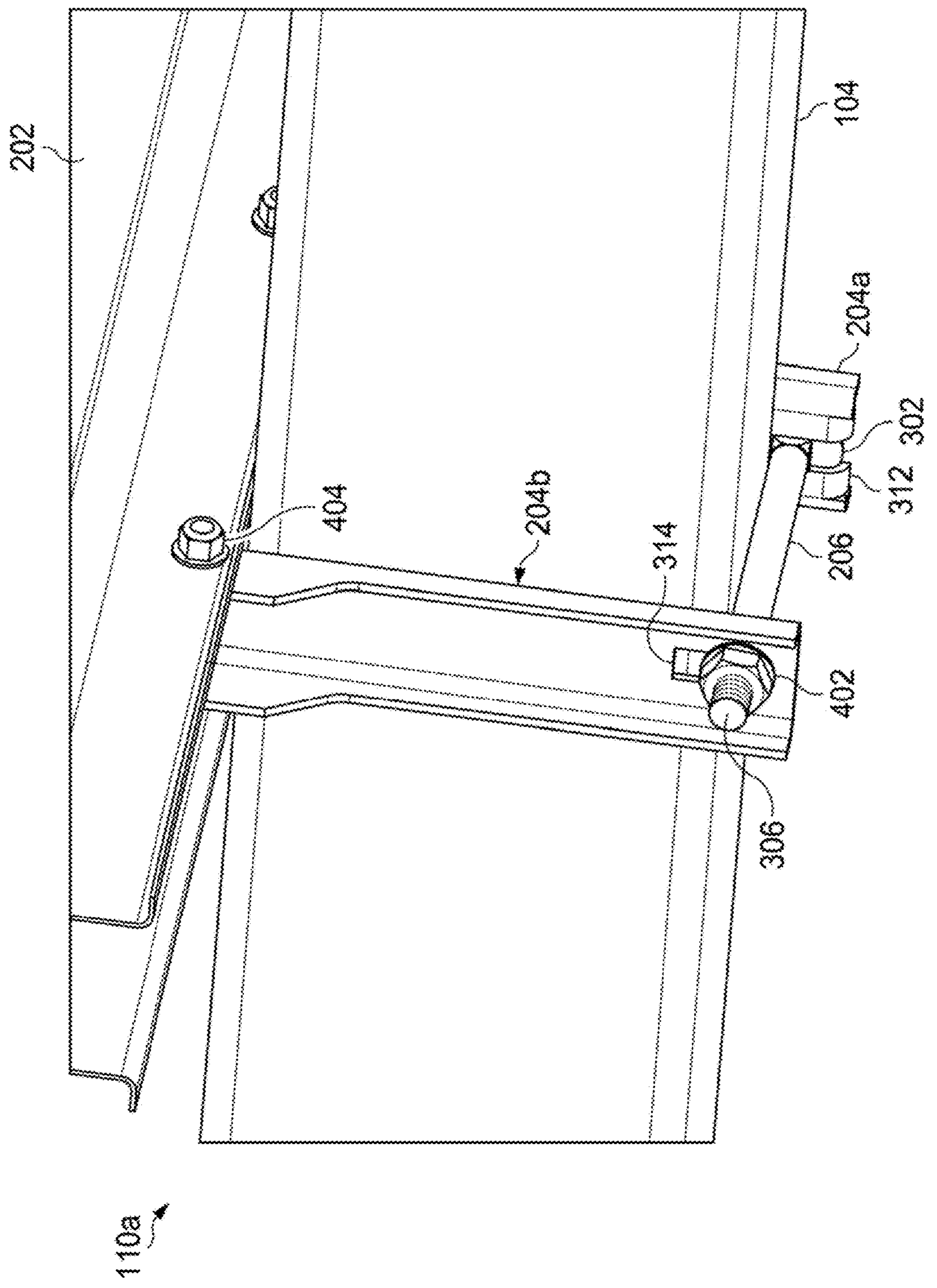
FIG. 4 is an isometric rear bottom view of the module mounting assembly in an installed state, in accordance with some first embodiments of the present invention.

FIG. 4 is an isometric rear bottom view of the module mounting assembly 110*a* in an installed state, in accordance with some first embodiments of the present invention. As shown, the coupling bolt (not shown) that extends through the holes of the hat rail 202 and of the vertical member 204*b* is secured therethrough by a coupling nut 404. Further, as shown, the locking bolt 206 that extends from the vertical member 204*a* to the vertical member 204*b* is secured by a locking nut 402.

Figure 5:
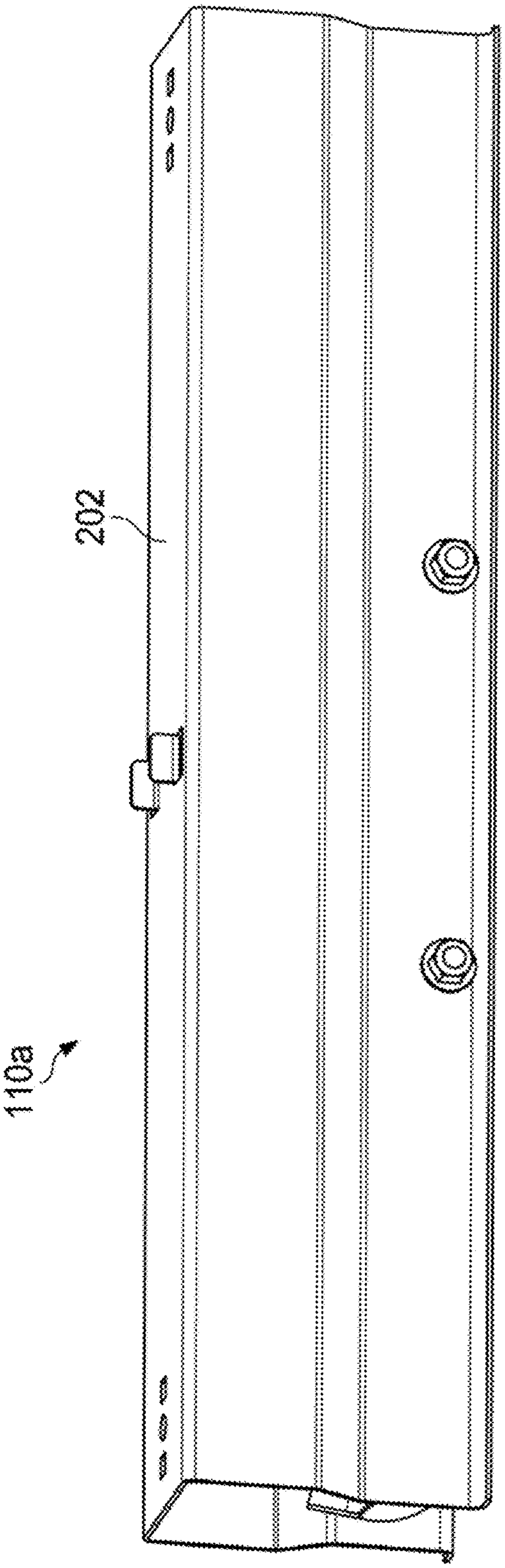
FIG. 5 is an isometric rear side view of the module mounting assembly in a collapsed state, in accordance with some first embodiments of the present invention.

FIG. 5 is an isometric rear side view of the module mounting assembly 110*a* in a collapsed state, in accordance with some first embodiments of the present invention. As shown, the vertical members 204*a* and 204*b* (slightly visible from an end of the hat rail 202) as well as the locking bolt 206 (not shown) and locking nut 402 (not shown) are pivoted to reside within the hat rail 202, rendering the module mounting assembly 110*a* smaller and easier for packaging and transport. Notably, in order to have the vertical members 204*a* and 204*b* reside fully within the hat rail 202, the width of the vertical members 204*a* and 204*b* must be equal to or less than the width of the opening in the hat rail 202.

Figure 6:
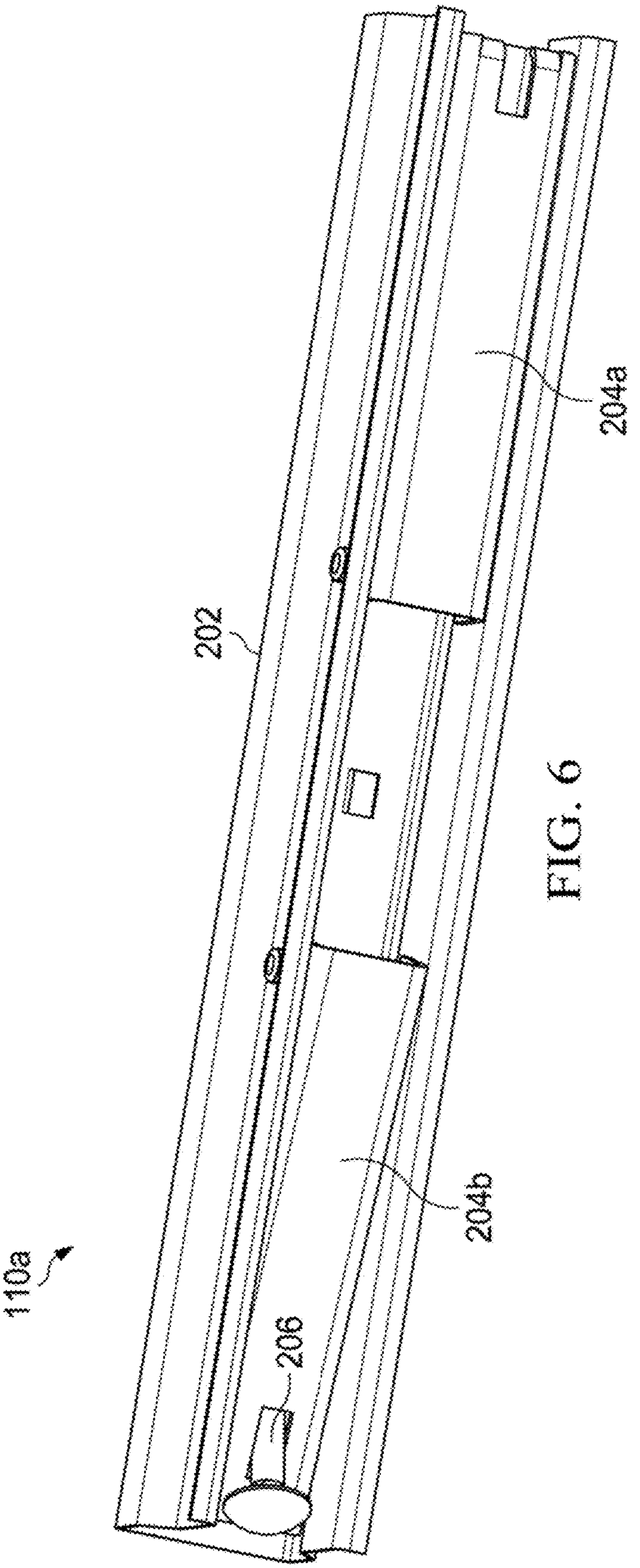
FIG. 6 is an isometric bottom view of the module mounting assembly in a collapsed state, in accordance with some first embodiments of the present invention.

FIG. 6 is an isometric bottom view of the module mounting assembly 110*a* in a collapsed state, in accordance with some first embodiments of the present invention. As shown, the vertical members 204*a* and 204*b* as well as the locking bolt 206 and locking nut 402 (not shown) have been pivoted to reside within the hat rail 202.

Figure 7:
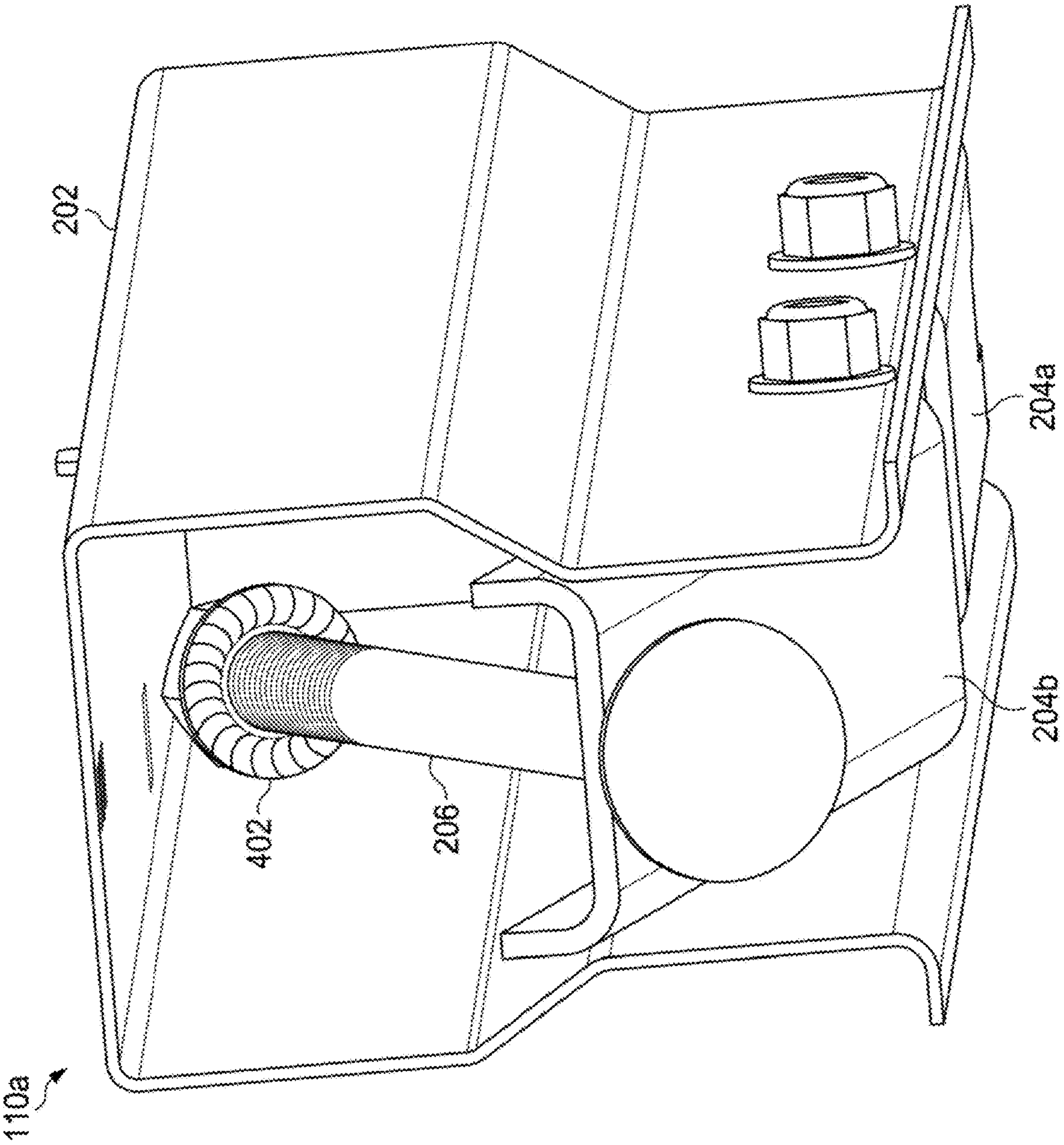
FIG. 7 is an isometric rear view of the module mounting assembly in a collapsed state, in accordance with some first embodiments of the present invention.

FIG. 7 is an isometric rear view of the module mounting assembly 110*a* in a collapsed state, in accordance with some first embodiments of the present invention. As shown, the vertical members 204*a* and 204*b* as well as the locking bolt 206 and locking nut 402 have been pivoted to reside within the hat rail 202.

Figure 8:
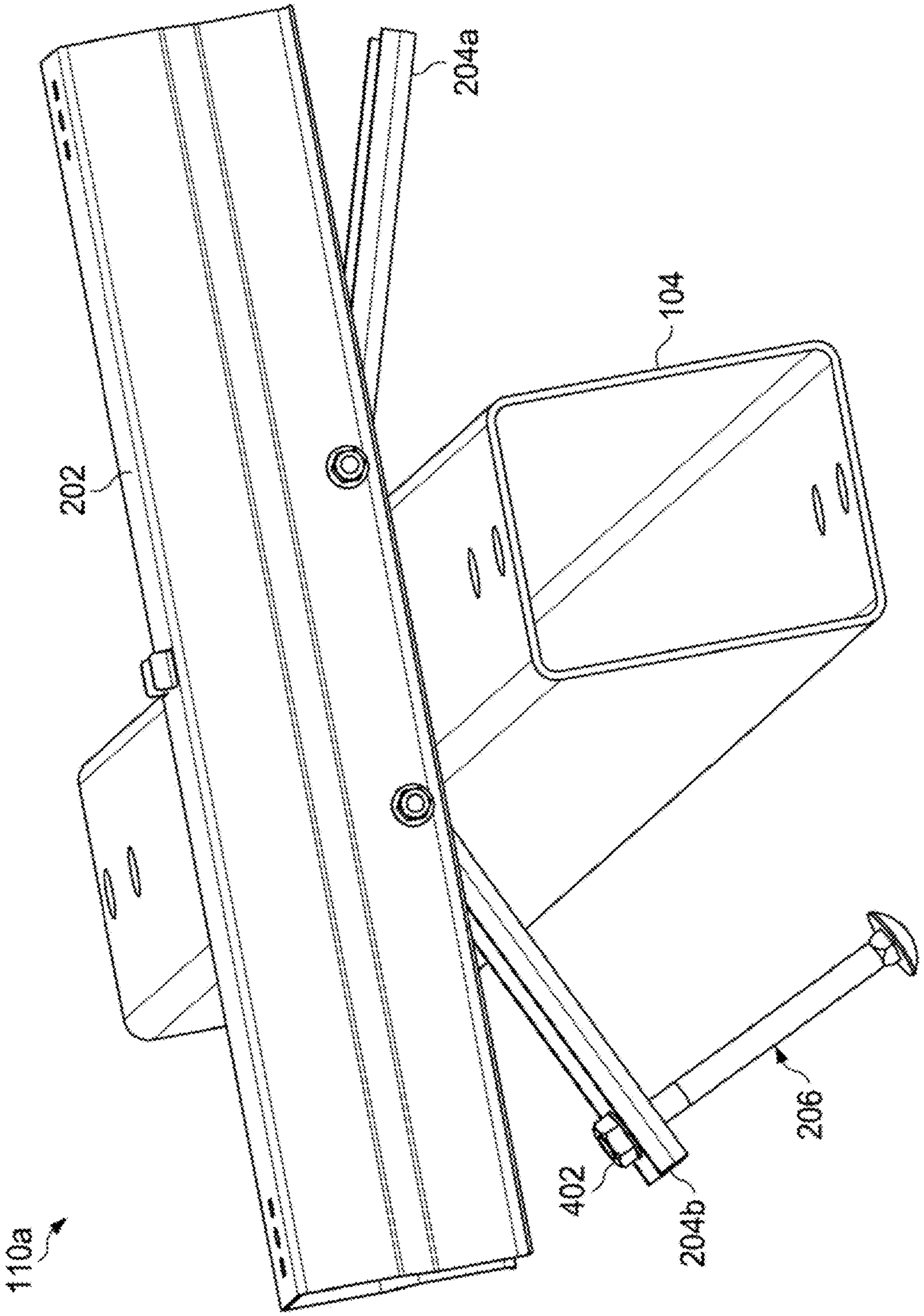
FIG. 8 is an isometric side view of the module mounting assembly in an unfolded state, in accordance with some first embodiments of the present invention.

FIG. 8 is an isometric side view of the module mounting assembly 110*a* in an unfolded state, in accordance with some first embodiments of the present invention. As shown, the hat rail 202 has been positioned on the top surface of the torque tube 104. The vertical members 204*a* and 204*b* have been being pivoted out from within the hat rail 202, also bringing out the locking bolt 206 and the locking nut 402.

Figure 9:
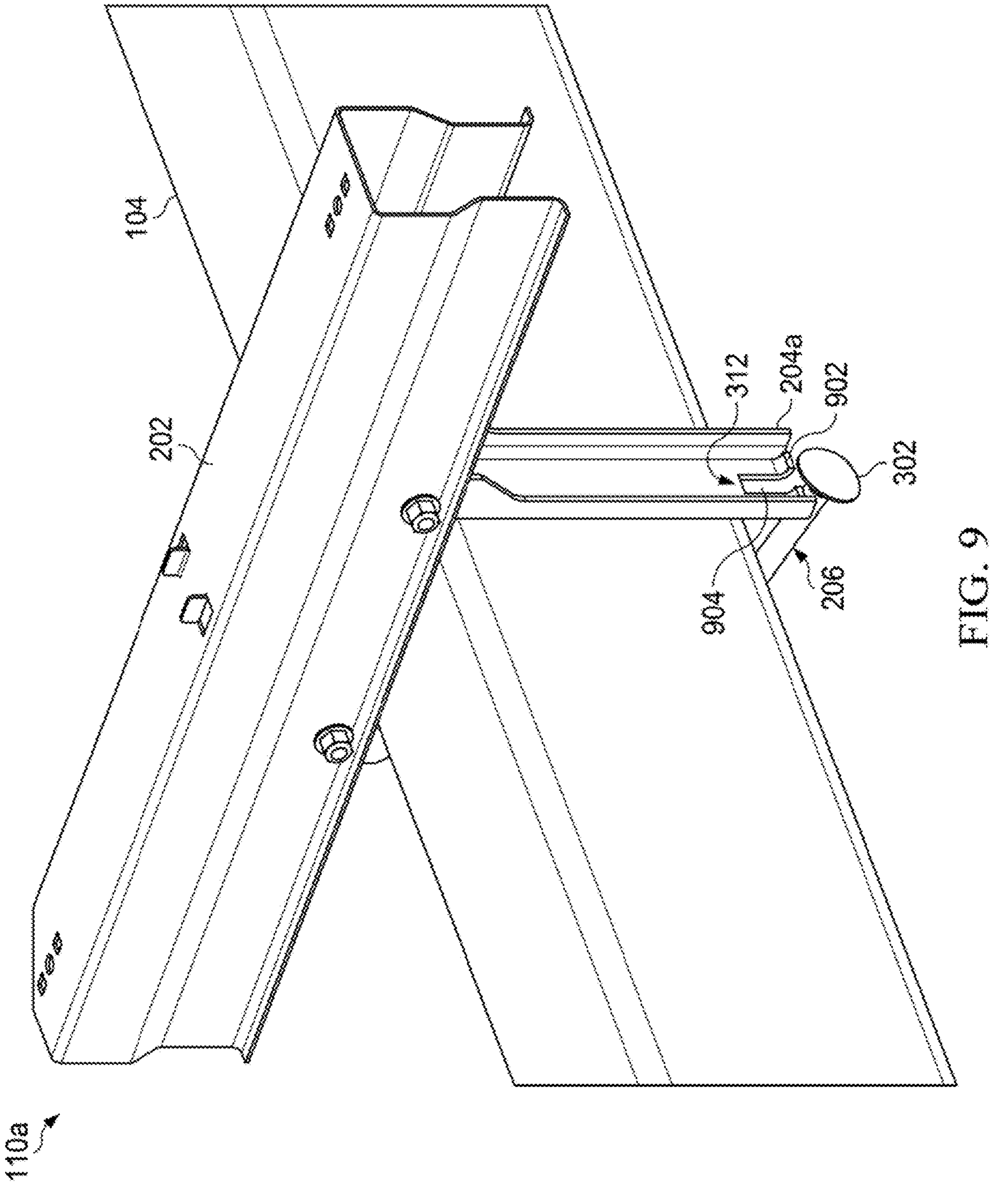
FIG. 9 is an isometric front perspective view of the module mounting assembly in a pre-latched state, in accordance with some first embodiments of the present invention.

FIG. 9 is an isometric front perspective view of the module mounting assembly 110*a* in a pre-latched state, in accordance with some first embodiments of the present invention. As shown, the hat rail 202 has been positioned on the top surface of the torque tube 104. The vertical members 204*a* and 204*b* have been pivoted to rest flush against the opposing side surfaces of the torque tube 104. The locking bolt 206 has been pivoted and extended so that the head 302 of the locking bolt 206 extends beyond the retention tabs 902 and the notch 904 of the one or more retention features 312 of the vertical member 204*a*.

Figure 10:
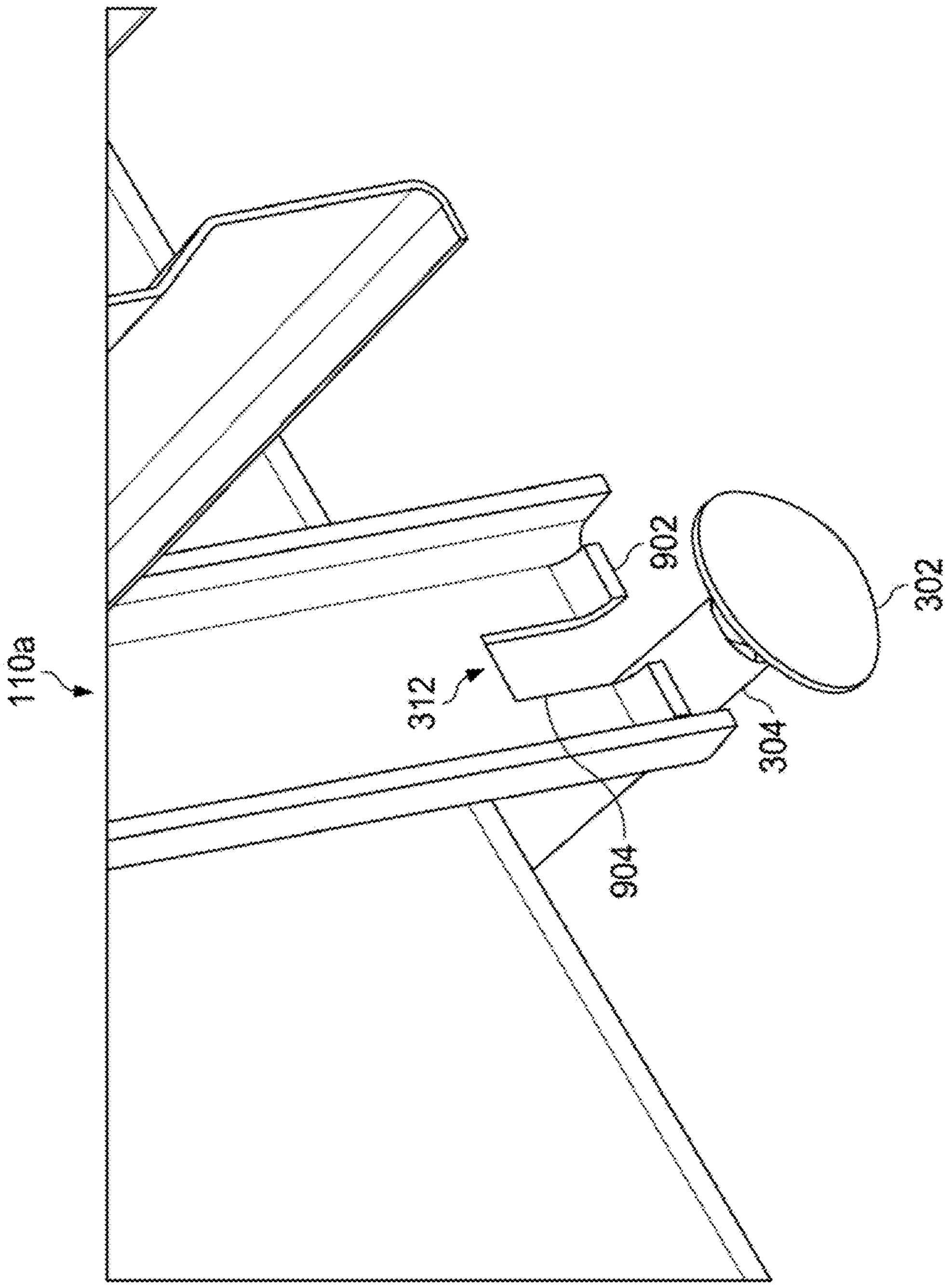
FIG. 10 is an isometric zoomed-in front view of the module mounting assembly in a pre-latched state, in accordance with some first embodiments of the present invention.

FIG. 10 is an isometric zoomed-in front view of the module mounting assembly 110*a* in a pre-latched state, in accordance with some first embodiments of the present invention. As shown, the head 302 of the locking bolt 206 has been pivoted and extended beyond the retention tabs 902. The shaft 304 of the locking bolt 206 is about to be positioned inside the notch 904, so that when the locking nut 402 (not shown) is tightened the head 302 of the locking bolt 206 will be secured by the retention tabs 902.

Figure 11:
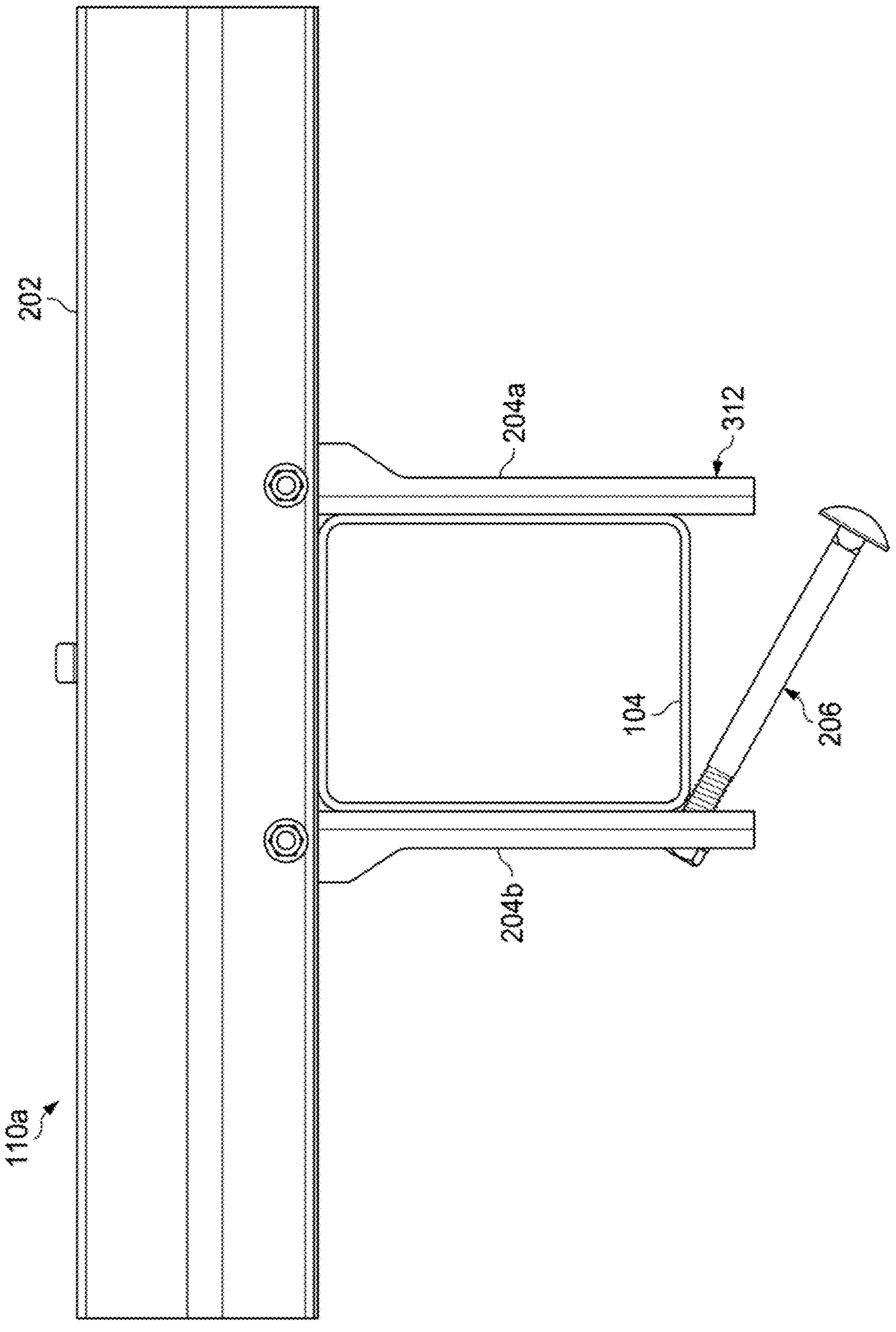
FIG. 11 is an isometric side view of the module mounting assembly in a pre-latched state, in accordance with some first embodiments of the present invention.

FIG. 11 is an isometric side view of the module mounting assembly 110*a* in a pre-latched state, in accordance with some first embodiments of the present invention. As shown, the hat rail 202 has been positioned on the top surface of the torque tube 104. The vertical members 204*a* and 204*b* have been pivoted to rest flush against the opposing side surfaces of the torque tube 104. The locking bolt 206 has been pivoted and extended so that the head 302 of the locking bolt 206 extends beyond the retention tabs 902 and the notch 904 of the one or more retention features 312 of the vertical member 204*a*.

Figure 12:
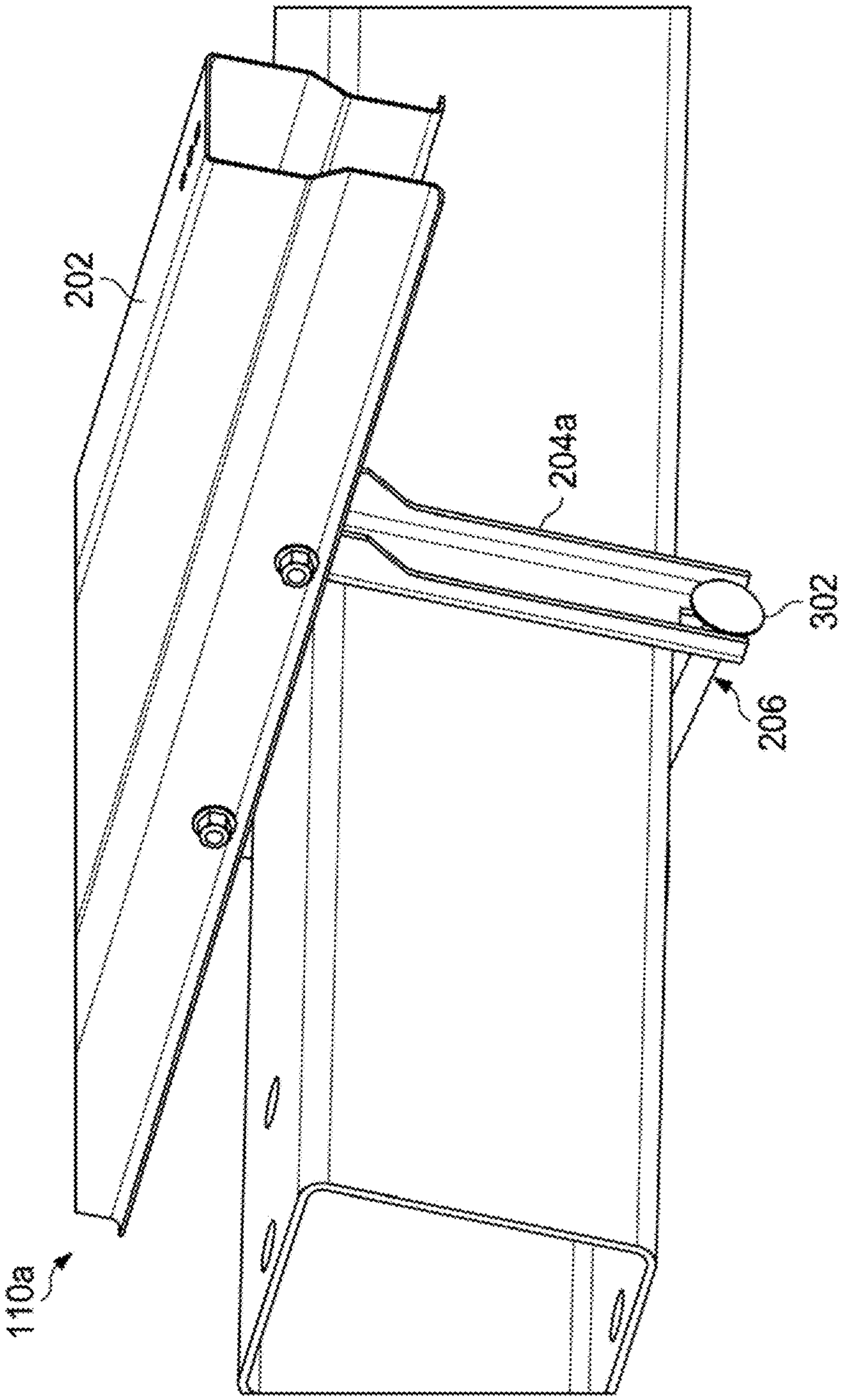
FIG. 12 is an isometric front perspective view of the module mounting assembly in a pre-latched state, in accordance with some first embodiments of the present invention.

FIG. 12 is an isometric front perspective view of the module mounting assembly 110*a* in a pre-latched state, in accordance with some first embodiments of the present invention. As shown, the hat rail 202 is positioned on the top surface of the torque tube 104. The vertical members 204*a* and 204*b* have been pivoted to rest flush against the opposing side surfaces of the torque tube 104. The locking bolt 206 has been pivoted so that the head 302 of the locking bolt 206 has passed over the retention tabs 902, and the shaft 304 has entered into the notch 904 of the vertical member 204*a*.

Figure 13:
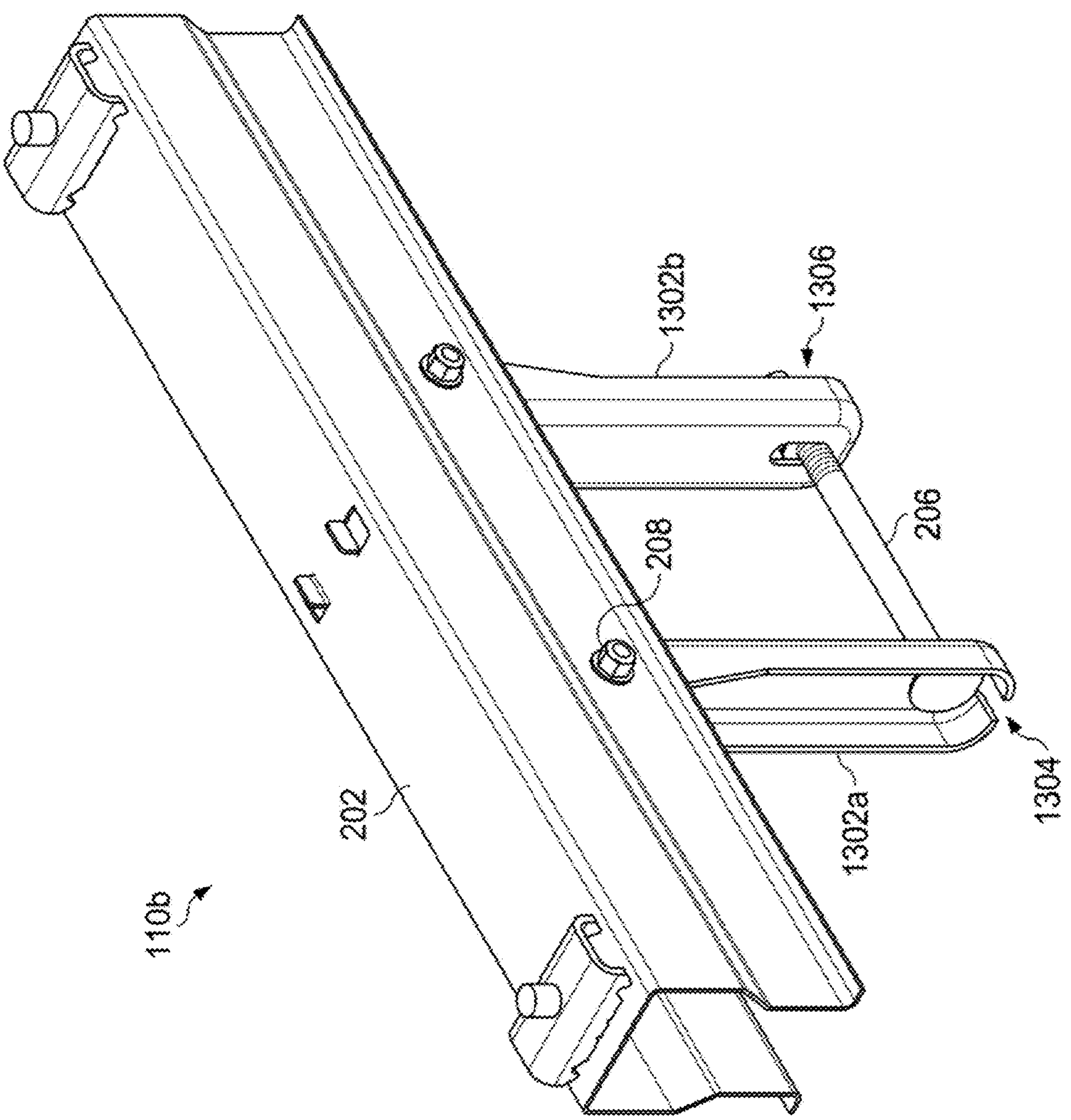
FIG. 13 is an isometric front perspective view of a module mounting assembly in an installed state, in accordance with some second embodiments of the present invention.

FIG. 13 is an isometric front perspective view of a module mounting assembly 110*b* in an installed state, in accordance with some second embodiments of the present invention. The module mounting assembly 110*b* is similar to the module mounting assembly 110*a*, except that the shape and features of the vertical members 1302*a* and 1302*b* are different than the vertical members 204*a* and 204*b*.

Similar the module mounting assembly 110*a*, the module mounting assembly 110*b* includes a hat rail 202, which in the illustrated embodiment is shaped as an omega beam. In other embodiments, the hat rail 202 may be configured as a U-shaped beam or other-shaped beam. The module mounting assembly 110*b* further includes two vertical members 1302*a* and 1302*b* coupled to the hat rail 202 in a spaced-apart relationship, which may be substantially equal the width between the opposing side surfaces of the torque tube 104. The two vertical members 204*a* and 204*b* may be secured to the hat rail 202 by coupling bolts 208 positioned through holes (not shown) disposed in the opposing side walls of the hat rail 202 and disposed in opposing sides of the vertical members 1302*a* and 1302*b* and by coupling nuts 404 (not shown). By using holes, coupling bolts 208 and coupling nuts 404, the vertical members 1302*a* and 1302*b* may pivot relative to the hat rail 202 before installation. Although the module mounting assembly 110*b* is being shown as using coupling bolts 208 and coupling nuts 404, other coupling mechanisms such as pins and clips can be used. Further, although the module mounting assembly 110*b* is being shown as using coupling bolts 208 that extend across the entire width of the hat rail 202 and vertical members 1302*a* and 1302*b*, a coupling mechanism, e.g., a coupling bolt/nut pair, can be used to couple each side of each vertical member 1302*a* and 1302*b* separately to a side of the hat rail 202.

As shown, each of the vertical members 1302*a* and 1302*b* have a back surface configured to rest flush against a side surface of the torque tube 104. In some embodiments, the back surface may be flat. Each of the vertical members 1302*a* and 1302*b* also include side projections configured to reinforce the stability of the vertical members 1302*a* and 1302*b*. The side projections of the vertical members 1302*a* and 1302*b* are deeper than the side projections of the vertical members 204*a* and 204*b*.

The module mounting assembly 110*b* further includes the locking bolt 206 and locking nut 402 (not shown) that retain the vertical members 1302*a* and 1302*b* in a straddled relationship about the torque tube 104.

The vertical member 1302*a* includes one or more retention features 1304 to retain the head 302 and shaft 304 of the locking bolt 206. Similarly, the vertical member 1302*b* includes one or more retention features 1306 to retain the threading portion 306 and the locking nut 402. Like the one or more retention features 312, the one or more retention features 1304 of the vertical member 1302*a* include a notch and retention tabs, however of different shapes. In the illustrated embodiment, the retention tabs of the one or more retention features 1304 of the vertical member 1302*a* are curved continuations of the side projections that terminate at the notch opening. The one or more retention features 1306 of the vertical member 1302*b* include a window and curved continuations of the side projections that may or may not connect to form a substantially semicircular extension (as shown having a small flat bottom segment).

Figure 14:
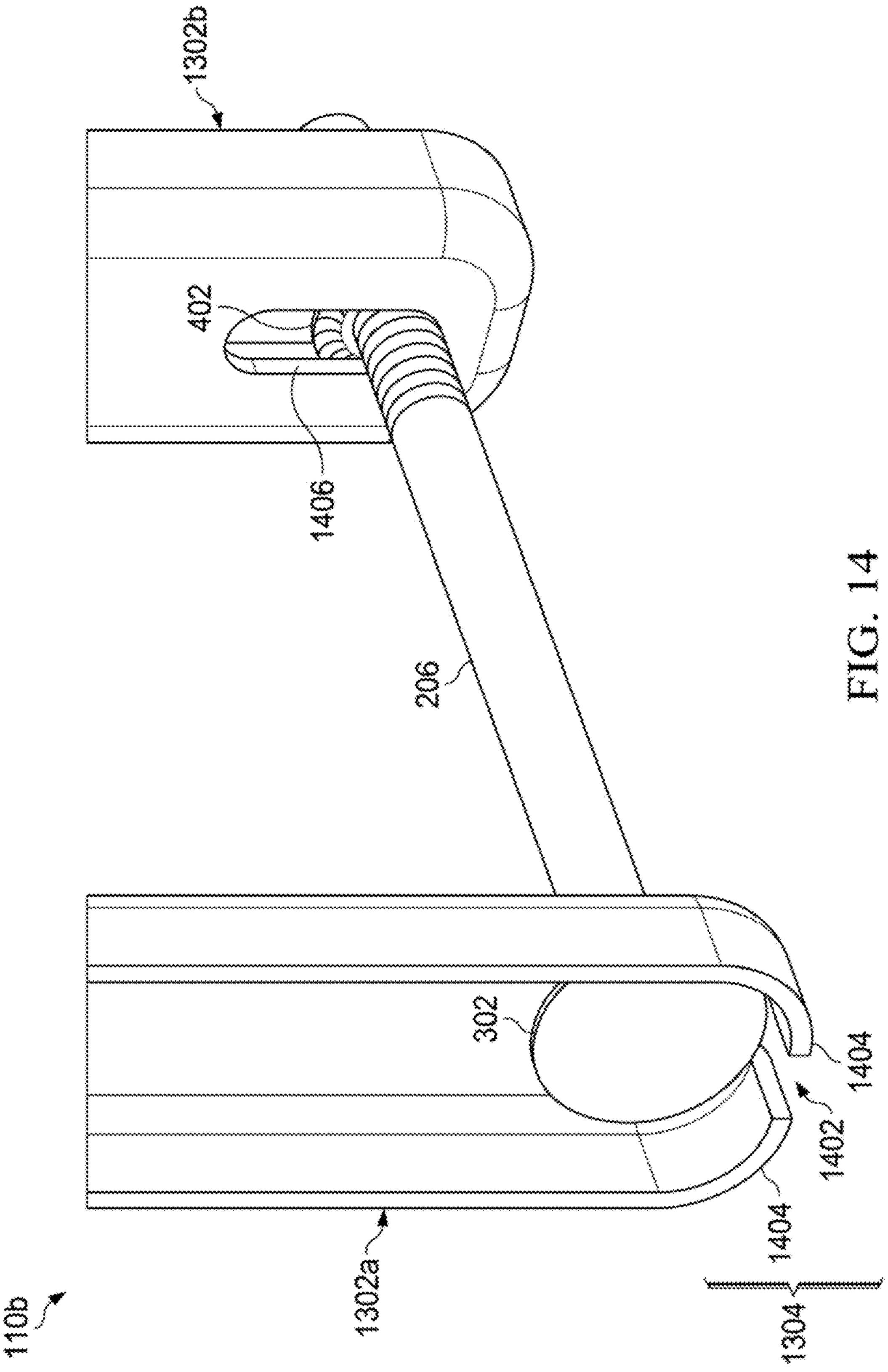
FIG. 14 is an isometric zoomed-in front view of the module mounting assembly in a latched state, in accordance with some second embodiments of the present invention.

FIG. 14 is an isometric zoomed-in front view of the module mounting assembly 110*b* in a latched state, in accordance with some second embodiments of the present invention. As shown, the vertical member 1302*a* includes a notch 1402 and retention tabs 1404, which are parts of the one or more retention features 1304 of the vertical member 1302*a*. The shaft 304 of the locking bolt 206 is in the notch 904. The head 302 of the locking bolt 206 is seated within the retention tabs 1404. The threading portion 1306 of the locking bolt 206 extends through the window 1406, which in this embodiment is shown to have curved top and bottom edges. The locking nut 402 has been tightened, and is seated within the curved continuations of the side projections of the vertical member 1302*b*.

Figure 15:
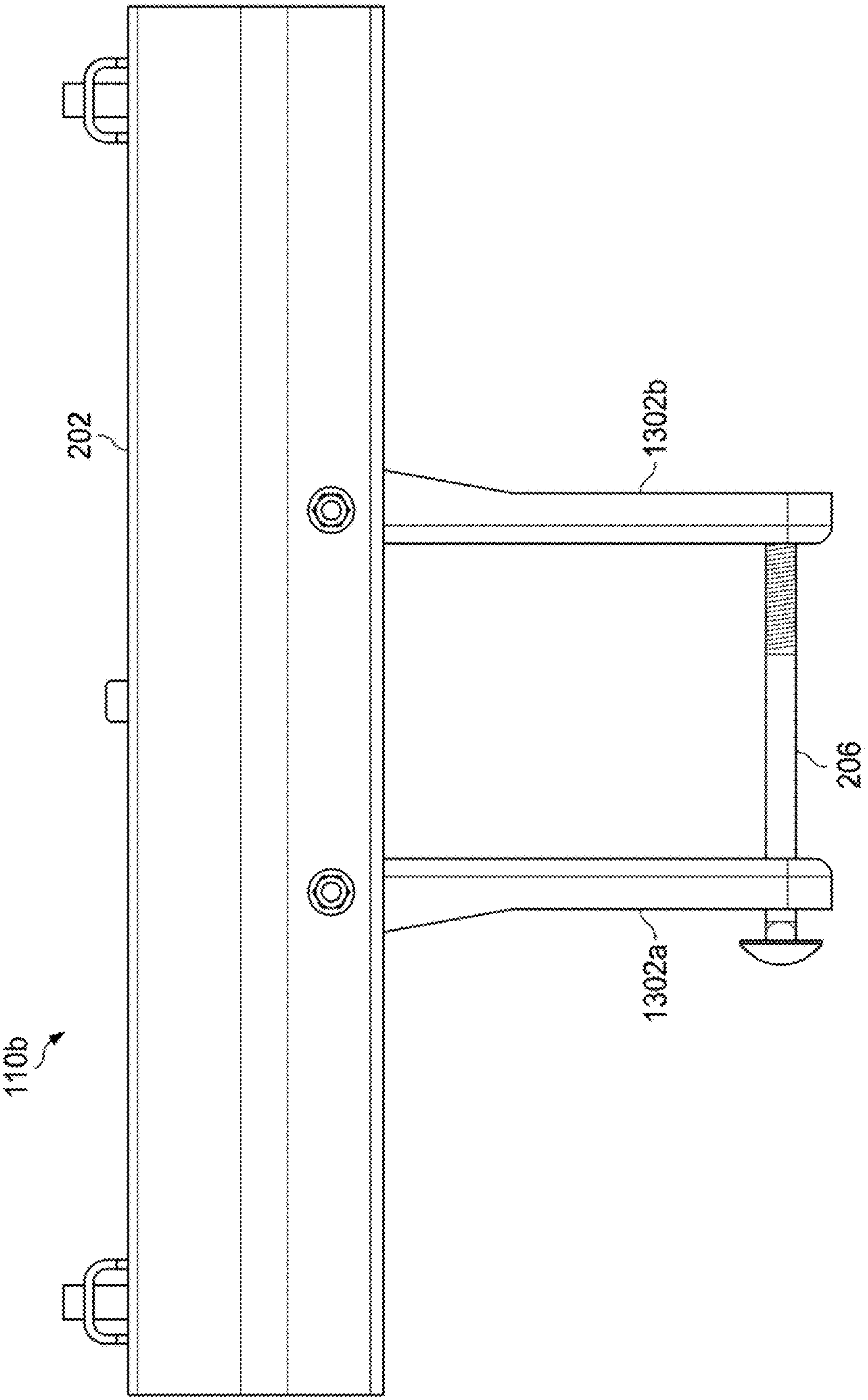
FIG. 15 is an isometric side view of the module mounting assembly in an pre-latched state, in accordance with some second embodiments of the present invention.

FIG. 15 is an isometric side view of the module mounting assembly in an pre-latched state, in accordance with some second embodiments of the present invention. The vertical members 1302*a* and 1302*b* have been pivoted to rest perpendicular to the hat rail 202. The locking bolt 206 has been extended and pivoted so that the shaft 304 of the locking bolt 206 is within the notch 1402 and the head 302 of the locking bolt 206 is positioned to seat within the retention tabs 1404 of the vertical member 1302*a* when pushed farther inward or when the locking bolt 402 (not shown) is tightened. The threaded portion 306 extends through the window 1406 (not shown).

Figure 16:
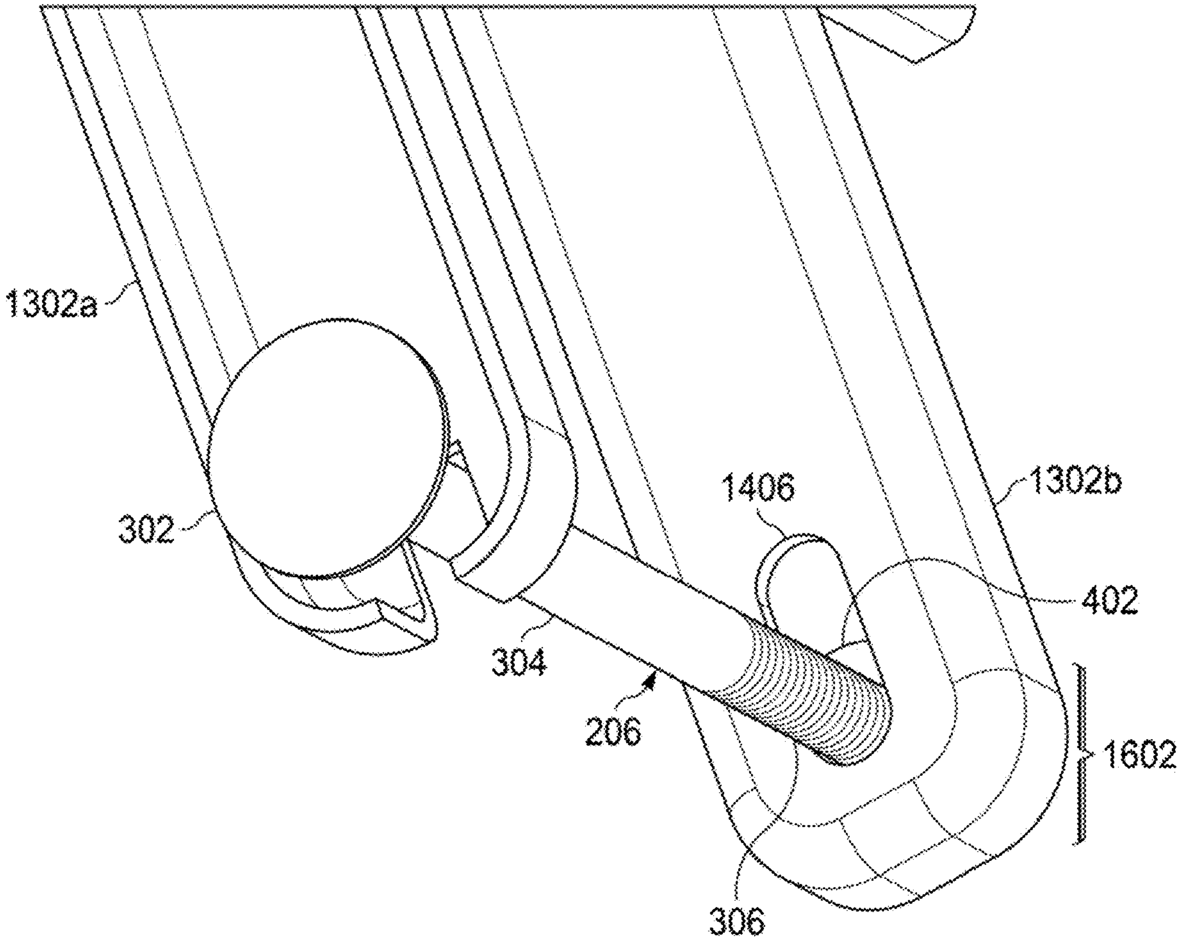
FIG. 16 is an isometric zoomed-in front view of the module mounting assembly in an pre-latched state, in accordance with some second embodiments of the present invention.

FIG. 16 is an isometric zoomed-in front view of the module mounting assembly 110*b* in an pre-latched state, in accordance with some second embodiments of the present invention. The vertical members 1302*a* and 1302*b* have been pivoted to be perpendicular to the hat rail 202. The locking bolt 206 has been extended and pivoted so that the shaft 304 of the locking bolt 206 is within the notch 1402 and the head 302 of the locking bolt 206 is positioned to seat within the retention tabs 1404 of the vertical member 1302*a* when pushed farther inward or when the locking bolt 402 is tightened. The locking nut 402 is shown seated within a retention bed 1602 formed by the curved continuations of the side projections of the vertical member 1302*b*.

Figure 17:
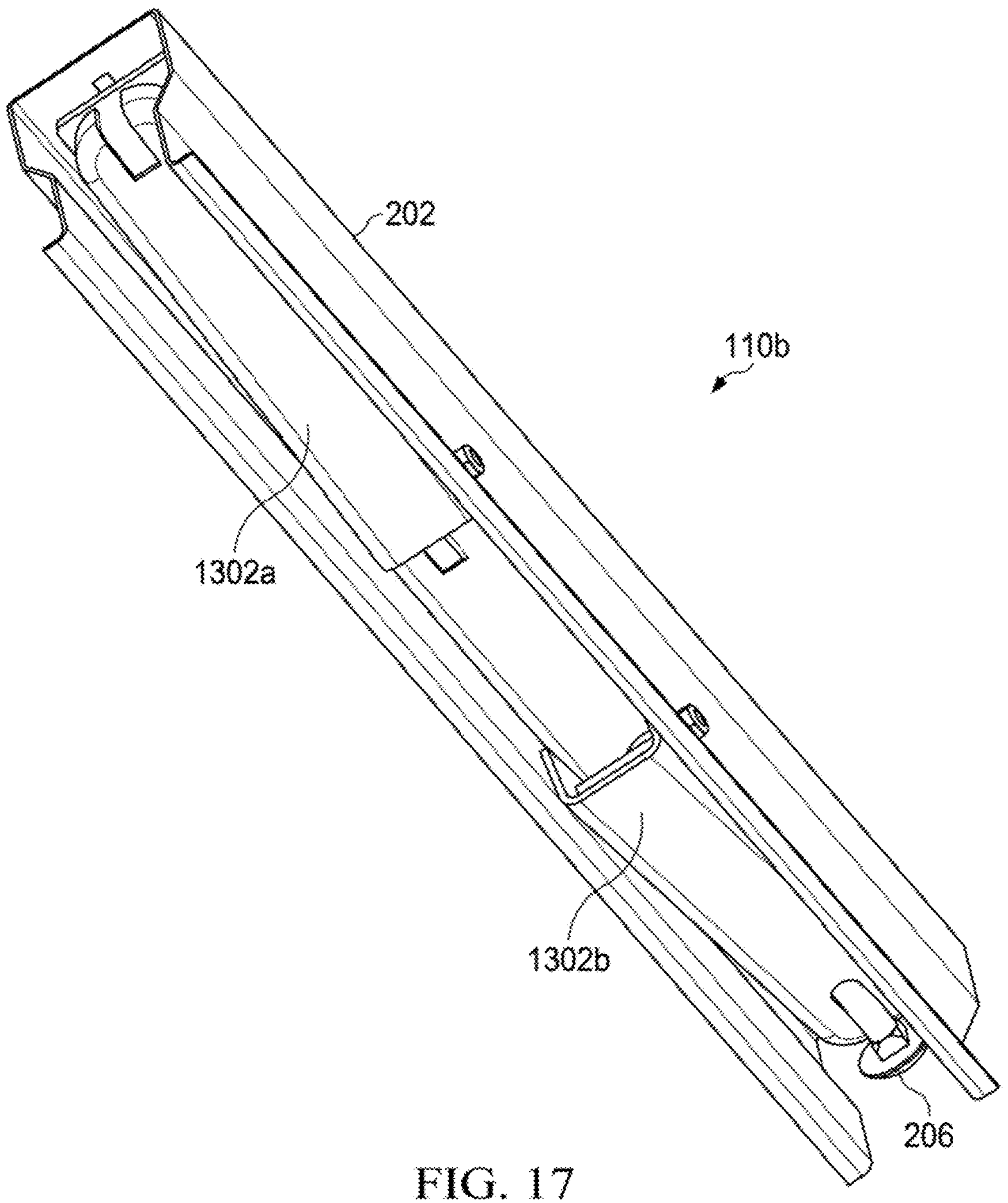
FIG. 17 is an isometric bottom view of the module mounting assembly in a collapsed state, in accordance with some second embodiments of the present invention.

FIG. 17 is an isometric bottom view of the module mounting assembly 110*b* in a collapsed state, in accordance with some second embodiments of the present invention. As shown, the vertical members 1302*a* and 1302*b* as well as the locking bolt 206 and locking nut 402 (not shown) have been pivoted to reside within the hat rail 202.

Figure 18:
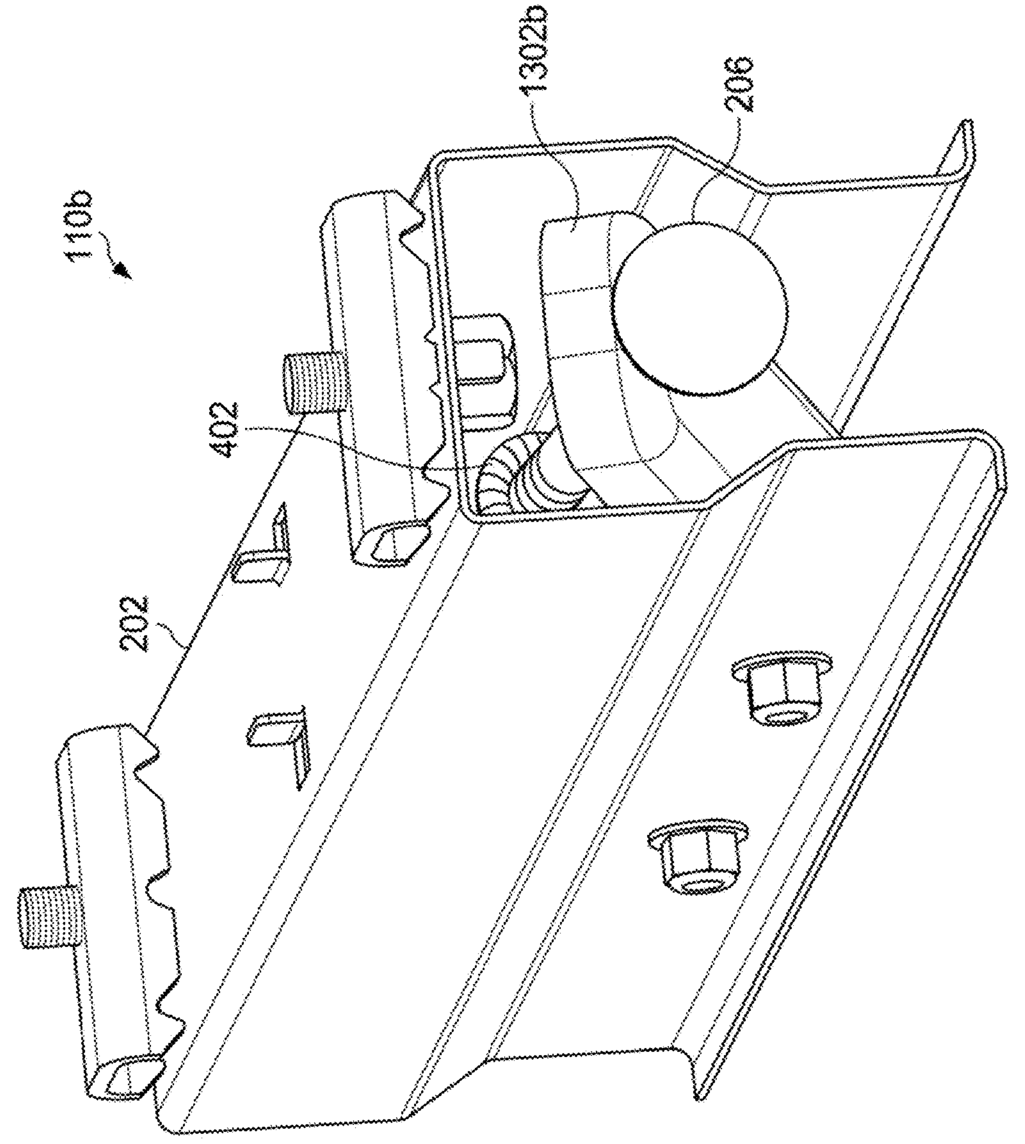
FIG. 18 is an isometric rear view of the module mounting assembly in a collapsed state, in accordance with some second embodiments of the present invention.

FIG. 18 is an isometric rear view of the module mounting assembly 110*b* in a collapsed state, in accordance with some second embodiments of the present invention. As shown, the vertical members 1302*a* and 1302*b* as well as the locking bolt 206 and locking nut 402 have been pivoted to reside within the hat rail 202.

Figure 19:
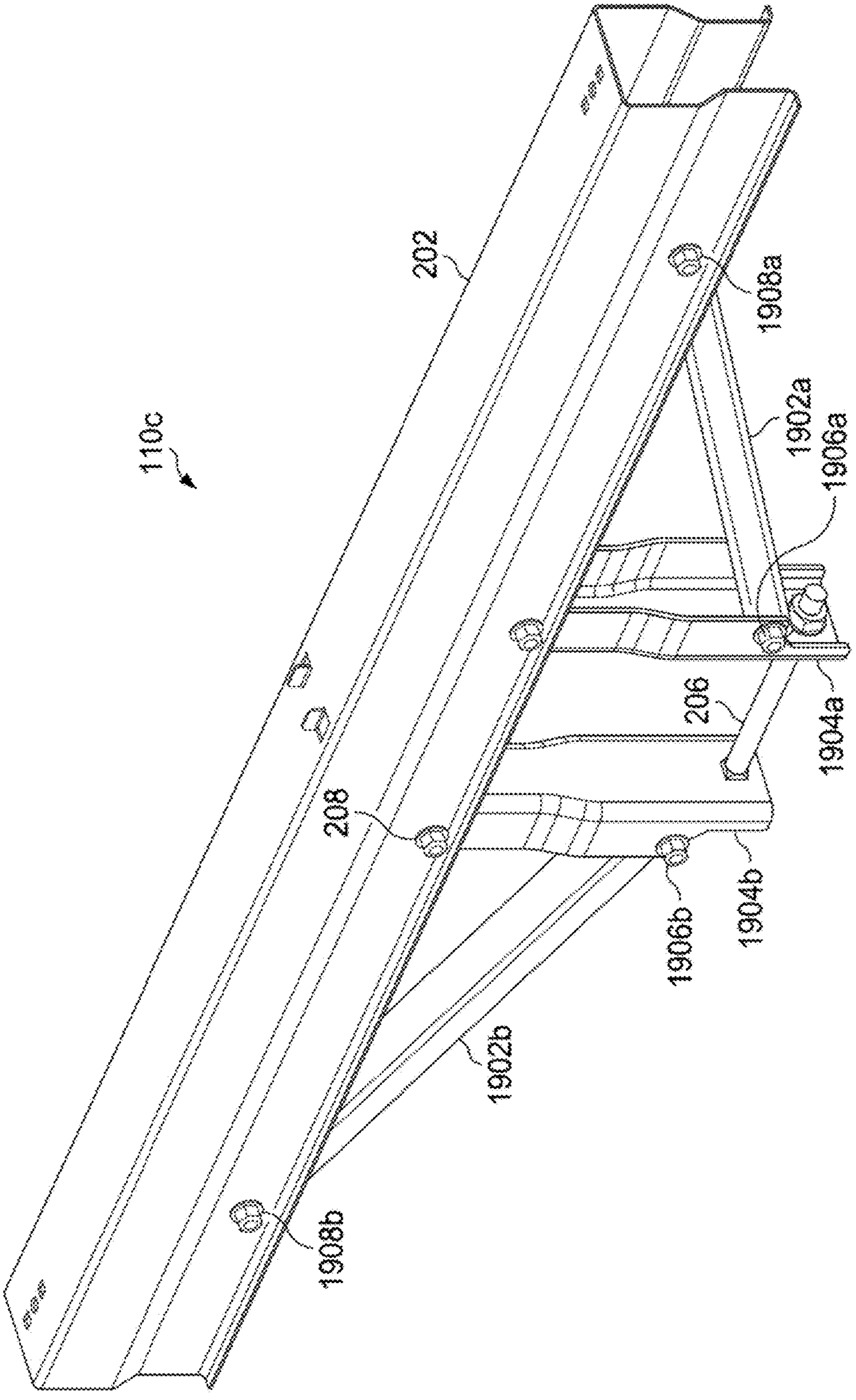
FIG. 19 is an isometric front perspective view of a module mounting assembly in an installed state with support struts, in accordance with some third embodiments of the present invention.

FIG. 19 is an isometric front perspective view of a module mounting assembly 110*c* in an installed state with support struts 1902*a* and 1902*b*, in accordance with some third embodiments of the present invention. The module mounting assembly 110*c* is similar to the module mounting assembly 110*a* and module mounting assembly 110*b*, except that the shape and features of the vertical members 1904*a* and 1904*b* are different than the vertical members 204*a* and 204*b* and the vertical members 1302*a* and 1302*b*, and support struts 1902*a* and 1902*b* have been added to improve stability.

Similar to the module mounting assembly 110*a* and module mounting assembly 110*b*, the module mounting assembly 110*c* includes a hat rail 202, which in the illustrated embodiment is shaped as an omega beam. In other embodiments, the hat rail 202 may be configured as a U-shaped beam or other-shaped beam. The module mounting assembly 110*c* further includes two vertical members 1904*a* and 1904*b* coupled to the hat rail 202 in a spaced-apart relationship, which may be substantially equal to the width between the opposing side surfaces of the torque tube 104. The two vertical members 1904*a* and 1904*b* may be secured to the hat rail 202 by coupling bolts 208 positioned through holes (not shown) disposed in the opposing side walls of the hat rail 202 and disposed in opposing side projections of the vertical members 1904*a* and 1904*b* and by coupling nuts 404 (not shown). By using holes, coupling bolts 208 and coupling nuts 404, the vertical members 1904*a* and 1904*b* may pivot relative to the hat rail 202 before installation and before the support struts 1902*a* and 1902*b* are installed. Although the module mounting assembly 110*c* is being shown as using coupling bolts 208 and coupling nuts 404, other coupling mechanisms such as pins and clips can be used. Further, although the module mounting assembly 110*c* is being shown as using coupling bolts 208 that extend across the entire width of the hat rail 202 and vertical members 1904*a* and 1904*b*, a coupling mechanism, e.g., a coupling bolt/nut pair, can be used to couple each side of each vertical member 1904*a* and 1904*b* separately to a side of the hat rail 202.

As shown, each of the vertical members 1904*a* and 1904*b* have a back surface configured to rest flush against a side surface of the torque tube 104. In some embodiments, the back surface is flat. Each of the vertical members 1904*a* and 1904*b* include side projections configured to reinforce the stability of the vertical members 1904*a* and 1904*b*. The side projections of the vertical members 1904*a* and 1904*b* have a more complex design than the side projections of the vertical members 204*a* and 204*b* and the vertical members 1302*a* and 1302*b*.

As shown, each of the side projections of the vertical members 1904*a* and 1904*b* are divided into four segments, namely, a top segment that projects outward sufficiently to include the holes configured to cooperate with the hat rail 202, a strut-coupling segment that projects outward sufficiently to include holes to cooperate with a respective support strut 1902*a* or 1902*b*, a transitional segment between the top segment and the strut-coupling segment, in this embodiment having the same projection outward as the top segment and strut-coupling segment or in other embodiments transitions outwardly therebetween if the projections are different, and a bottom segment that projects outward less than the other segments, in some embodiments to make interaction with the one or more retention features more accessible.

The module mounting assembly 110*c* further includes the locking bolt 206 and locking nut 402 (not shown) that retain the vertical members 1904*a* and 1904*b* in a straddled relationship about the torque tube 104.

The vertical member 1904*a* includes one or more retention features to retain the head 302 and shaft 304 of the locking bolt 206. Similarly, the vertical member 1904*b* includes one or more retention features to retain the locking nut 402 and the threading portion 306 of the locking bolt 206. The one or more retention features of the vertical member 1904*a* include a notch and retention tabs similar to the one or more retention features 312 of the vertical member 204*a* of the module mounting assembly 110*a*. The one or more retention features of the vertical member 1904*b* include a window similar to the window 314 of the vertical member 204*b* of the module mounting assembly 110*a*.

In some embodiments, each of the support struts 1902*a* and 1902*b* includes a U-shaped beam with a consistent cross-section across its length. The top end of each support strut 1902*a* or 1902*b* has holes (not shown) on its sides to align with holes on the sides in the hat rail 202, so that a coupling bolt 1908*a* or 1908*b* can extend therethrough and so that a corresponding coupling nut (not shown) can secure the coupling bolt 1908*a* or 1908*b* therein. Similarly, the bottom end of each support strut 1902*a* or 1902*b* has holes (not shown) on its sides to align with holes on the sides in the vertical member 1904*a* or 1904*b*, so that a coupling bolt 1906*a* or 1906*b* can extend therethrough and so that a corresponding coupling nut (not shown) can secure the coupling bolt 1906*a* or 1906*b* therein.

Although the support struts 1902*a* and 1902*b* are described as having a U-shaped cross section, other cross sections are also possible. Further, although the support struts 1902*a* and 1902*b* are described as having a consistent cross-section, the cross section need not be consistent. In some embodiments, the width of each of the support struts 1902*a* and 1902*b* is less than or equal to the width between the inner surfaces of the hat rail 202, so that the support struts 1902*a* and 1902*b* can be pivoted inside the hat rail 202 for transport.

In some embodiments, a supporting strut may be coupled between the hat rail and each vertical member. The supporting strut may couple to the respective vertical member at a position between the top and bottom ends of the vertical member.

Figure 20:
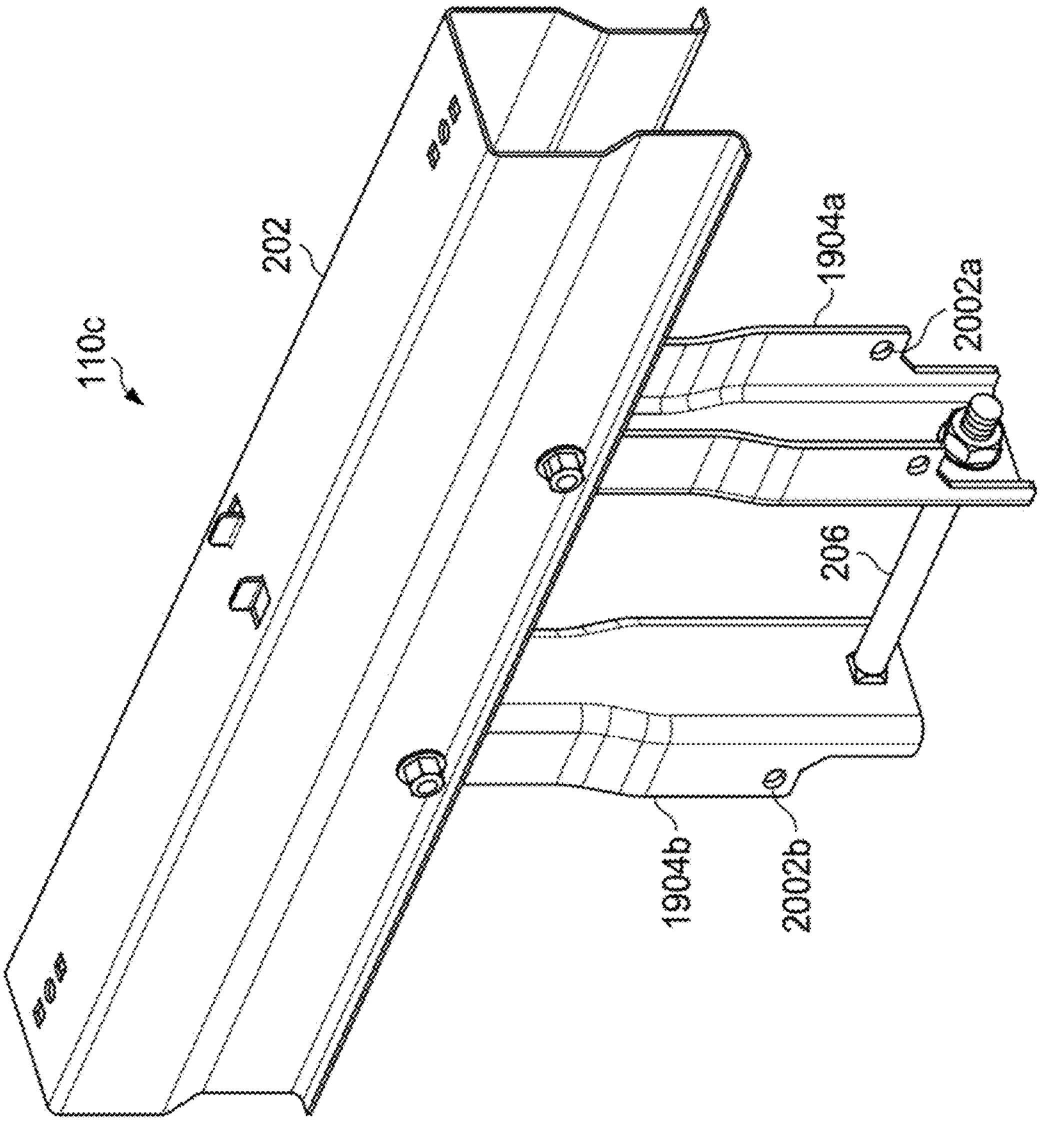
FIG. 20 is an isometric front view of the module mounting assembly in an installed state without support struts, in accordance with some third embodiments of the present invention.

FIG. 20 is an isometric front view of the module mounting assembly 110*c* in an installed state without the support struts 1902*a* and 1902*b*, in accordance with some third embodiments of the present invention. As shown, the vertical member 1904*a* has holes 2002*a* to assist with coupling the vertical member 1904*a* to the support strut 1902*a*. The vertical member 1904*b* has holes 2002*b* to assist with coupling the vertical member 1904*b* to the support strut 1902*b*. In some embodiments, the width between the inner surfaces of the segment of the vertical member 1904*a* and 1904*b* that couples to the support strut 1902*a* and 1902*b* is the same or wider than the width between the outer side surfaces of the support strut 1902*a* and 1902*b*.

Figure 21:
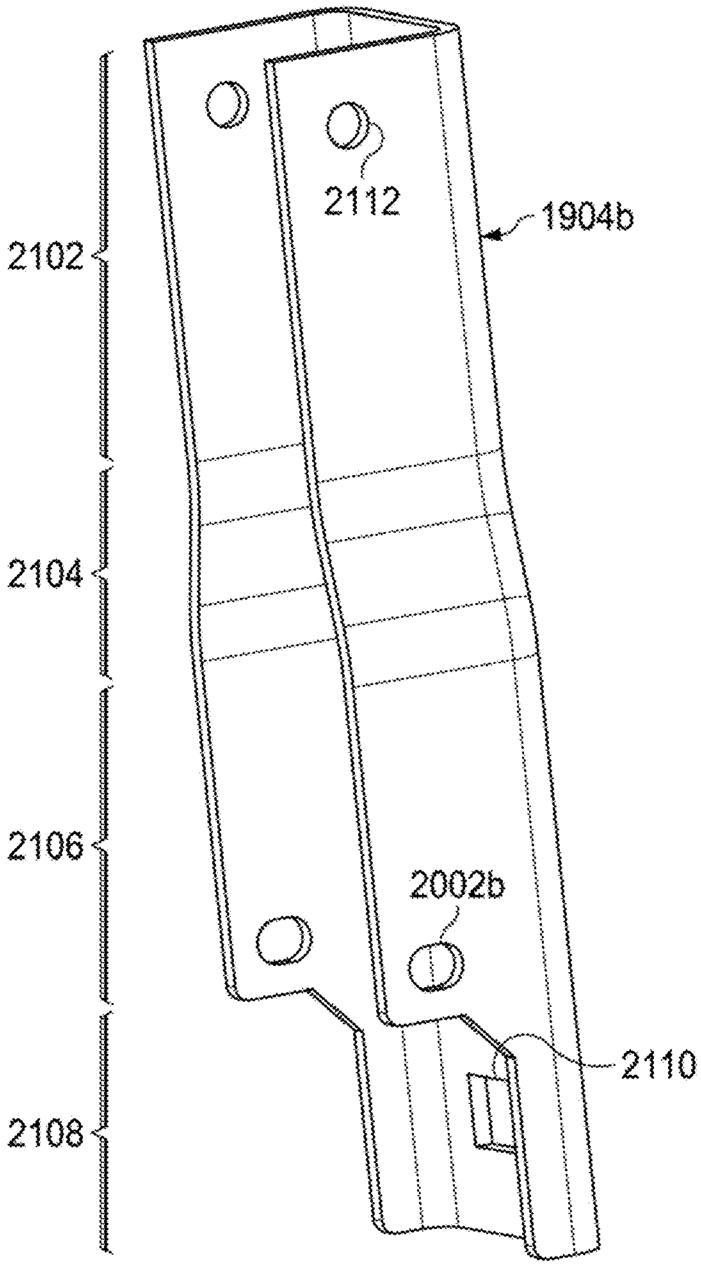
FIG. 21 is an isometric side view of a vertical member, in accordance with some third embodiments of the present invention.

FIG. 21 is an isometric side view of a vertical member 1904*b*, in accordance with some third embodiments of the present invention. As shown, the vertical member 1904*b* has a back surface configured to rest flush against a side surface of the torque tube 104. The vertical member 1904*b* include side projections configured to reinforce its stability. The side projections of the vertical member 1904*b* is divided into four segments, namely, a top segment 2102 that projects outward sufficiently to include the holes 2112 configured to cooperate with the hat rail 202, a strut-coupling segment 2106 that projects outward sufficiently to include the holes 2002*b* to cooperate with the support strut 1902*b*, a transitional segment 2104 between the top segment 2102 and the strut-coupling segment 2106 that in this embodiment retains the same projection outward as the top segment 2102 and strut-coupling segment 2106 or transitions outwardly therebetween if the projections are different, and a bottom segment 2108 that projects outward less than the other segments, in some embodiments in order to make interaction with the one or more retention features (e.g., the window 2110) more accessible. The width between the outer surfaces of the top segment 2102 is equal to or less than the width between the inner surfaces of the hat rail 202, and may be the same as the width between the outer side surfaces of the support struts 1902*a* and 2902*b*. The width between the inner surfaces of the strut-coupling segment 2102 is the same or wider than the width between the outer side surfaces of the support strut 1902*a* and 1902*b*.

Figure 22:
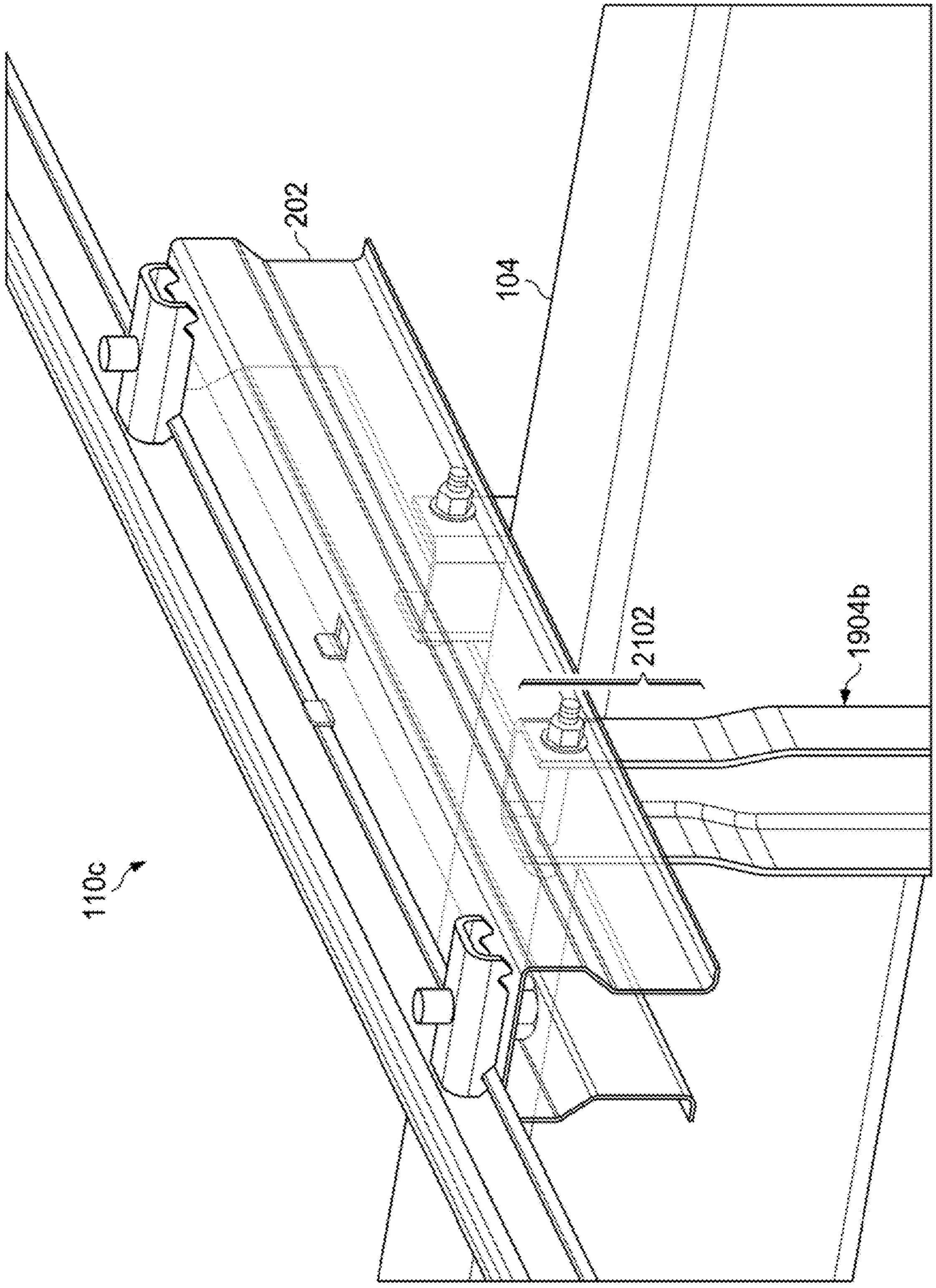
FIG. 22 is an isometric transparent rear side view of the module mounting assembly in an installed state without support struts, in accordance with some third embodiments of the present invention.

FIG. 22 is an isometric transparent rear side view of the module mounting assembly 110*c* in an installed state without the support struts 1902*a* and 1902*b*, in accordance with some third embodiments of the present invention. The module mounting assembly 110*c* illustrates a coupling bolt 208 extending through the holes 2112 in the top segment 2102 of the vertical member 1904*b* and the holes (not shown) in the top hat 202, and a coupling nut 404 securing the coupling bolt 208 therein.

The foregoing description of the preferred embodiments of the present invention is by way of example only, and other variations and modifications of the above-described embodiments and methods are possible in light of the foregoing teaching. The embodiments described herein are not intended to be exhaustive or limiting. The present invention is limited only by the following claims.

The invention claimed is:

1. A module mounting assembly for coupling a solar module to a torque tube, the torque tube having a top tube surface, a first side tube surface, a second side tube surface opposing the first side tube surface, and a bottom tube surface, the module mounting assembly comprising:

- a hat rail having a top rail surface, a bottom rail opening, opposing side rail surfaces, first connection points and second connection points;
- a first vertical member pivotably attached to the hat rail at the first connection points, the first vertical member capable of being pivoted inward about a first axis defined by the first connection points through the bottom rail opening to at least partially reside within a first internal portion of the hat rail, the first vertical member capable of being pivoted outward to rest flush on the first tube side surface of the torque tube during installation, the first vertical member having one or more first retention features;
- a second vertical member pivotably attached to the hat rail at the second connection points, the second vertical member capable of being pivoted inward about a second axis defined by the second connection points through the bottom rail opening to at least partially reside within a second internal portion of the hat rail, the second vertical member capable of being pivoted outward to rest flush on the second tube side surface of the torque tube during installation, the second vertical member having one or more second retention features;
- a locking mechanism configured to cooperate with the one or more first retention features and the one or more second retention features to secure the first vertical member against the first tube side surface of the torque tube and the second vertical member flush against the second tube side surface of the torque tube.

2. The module mounting assembly of claim 1, wherein the hat rail includes an omega beam.

3. The module mounting assembly of claim 1, wherein the first connection points are disposed on the opposing side rail surfaces at a first position along a length of the hat rail.

4. The module mounting assembly of claim 3, wherein the second connection points are disposed on the opposing side rail surfaces at a second position along a length of the hat rail.

5. The module mounting assembly of claim 4, wherein a distance between the first position and the second position is equal to a width between the first side tube surface and the second side tube surface.

6. The module mounting assembly of claim 5, wherein the first connection points and the second connection points include rail holes.

7. The module mounting assembly of claim 6, wherein the first vertical member is pivotably coupled to the hat rail at the first connection points using a coupling bolt and coupling nut.

8. The module mounting assembly of claim 1, wherein the first vertical member includes a flat surface configured to rest flush against the first tube side surface of the torque tube after installation.

9. The module mounting assembly of claim 1, wherein the first vertical member includes side extensions to increase rigidity of the first vertical member.

10. The module mounting assembly of claim 9, wherein the side extensions includes a top segment with coupling holes configured to cooperate with the hat rail at the first connection points.

11. The module mounting assembly of claim 10, wherein the first vertical member includes a consistent width.

12. The module mounting assembly of claim 10, wherein the first vertical member has a strut-coupling segment that is wider than the top segment, and further comprising a supporting strut that is coupled to the strut-coupling segment and to the hat rail at third connection points.

13. The module mounting assembly of claim 1, wherein the one or more first retention features of the first vertical member include a notch and retention tabs.

14. The module mounting assembly of claim 1, wherein the one or more second retention features of the second vertical member include a window.

15. The module mounting assembly of claim 1, wherein the locking mechanism includes a locking bolt and a locking nut.

16. The module mounting assembly of claim 15, wherein the locking bolt is sufficiently long to couple the first vertical member and the second vertical member across the bottom tube surface of the torque tube.

17. A method for coupling a module mounting assembly to a torque tube, the torque tube having a top tube surface, a first side tube surface, a second side tube surface opposing the first side tube surface, and a bottom tube surface, the method comprising:

- positioning a hat rail on top of a torque tube, the hat rail having a top rail surface, a bottom rail opening, opposing side rail surfaces, first connection points and second connection points;
- pivotably attaching a first vertical member to the hat rail at the first connection points, the first vertical member having one or more first retention features;
- pivotably attaching a second vertical member to the hat rail at the second connection points, the second vertical member having one or more second retention features;
- pivoting the first vertical member outward about a first axis defined by the first connection points from a first internal portion of the hat rail to rest flush on the first tube side surface of the torque tube;
- pivoting the second vertical member outward about a second axis defined by the second connection points from a second internal portion of the hat rail to rest flush on the second tube side surface of the torque tube; and
- installing a locking mechanism to cooperate with the one or more first retention features and the one or more second retention features to secure the first vertical member against the first tube side surface of the torque tube and the second vertical member flush against the second tube side surface of the torque tube.

18. The method of claim 17, wherein the first vertical member has a strut-coupling segment that is wider than the top segment, and further comprising coupling a supporting strut to the strut-coupling segment and to the hat rail at third connection points.

19. The method of claim 17, wherein the one or more first retention features of the first vertical member include a notch and retention tabs.

20. The method of claim 17, wherein the one or more second retention features of the second vertical member include a window.

21. The method of claim 17, wherein the locking mechanism includes a locking bolt and a locking nut.

* * * * *